United States Patent
Haddad et al.

(10) Patent No.: US 12,397,197 B2
(45) Date of Patent: Aug. 26, 2025

(54) DYNAMIC DATA COLLECTION AND SYSTEMATIC PROCESSING SYSTEM

(71) Applicant: CaddyHack, Inc., Newton, NJ (US)

(72) Inventors: Robert Haddad, Acton, MA (US); Heather Connelly, Green Township, NJ (US); Gary Marden, Kennebunk, ME (US); Delano Yoder, West Sacramento, CA (US)

(73) Assignee: CaddyHack, Inc., Newton, NJ (US)

( * ) Notice: Subject to any disclaimer, the term of this patent is extended or adjusted under 35 U.S.C. 154(b) by 0 days.

(21) Appl. No.: 18/942,327

(22) Filed: Nov. 8, 2024

(65) Prior Publication Data

US 2025/0144471 A1     May 8, 2025

Related U.S. Application Data

(60) Provisional application No. 63/547,758, filed on Nov. 8, 2023.

(51) Int. Cl.
*G06K 9/00* (2022.01)
*A63B 24/00* (2006.01)
(Continued)

(52) U.S. Cl.
CPC ...... *A63B 24/0021* (2013.01); *A63B 24/0003* (2013.01); *G06T 7/20* (2013.01);
(Continued)

(58) Field of Classification Search
CPC ............ B64U 2101/30; B64U 2201/10; B64U 2201/20; B64U 10/13; B64U 10/14; B64U 30/20; B64U 2201/00; B64U 2101/26; B64U 2101/00; B64U 2101/15; B64U 2101/20; B64U 70/10; B64U 20/80;
(Continued)

(56) References Cited

U.S. PATENT DOCUMENTS

| | | | |
|---|---|---|---|
| 11,599,392 B1 * | 3/2023 | Huang | G06V 10/17 |
| 2004/0147329 A1 | 7/2004 | Meadows et al. | |

(Continued)

OTHER PUBLICATIONS

International Search Report and Written Opinion, Application No. PCT/US2024/055246, mailed Mar. 6, 2025, 14 pages.

*Primary Examiner* — Alex Kok S Liew
(74) *Attorney, Agent, or Firm* — Ice Miller LLP; Richard Cruz

(57) ABSTRACT

A system includes a platform configured to receive a video recording of a flight path of an object and initiate back-end processing of the video recording. The back-end processing may include data modeling, object detection operations, normalizing operations, adjusting normalize data based on meta_camera specifications to compensate for limitations of the user device used to create the video recording, and applying mathematical techniques to the adjusted data to derive metrics relating to the flight path of the object and to generate an enhanced video clip of the flight path. In an embodiment, the back-end processing may further include generating a trace line of the flight path of the object, adding the trace line to the enhanced video clip, transmitting the enhanced video clip and the metrics to the user device, and storing the enhanced video clip and the metrics in back-end storage.

10 Claims, 9 Drawing Sheets

(51) Int. Cl.
  *G06T 7/20*    (2017.01)
  *G06T 7/70*    (2017.01)
  *H04N 23/61*   (2023.01)

(52) U.S. Cl.
  CPC ............. *G06T 7/70* (2017.01); *H04N 23/61* (2023.01); *A63B 2024/0034* (2013.01); *G06V 2201/07* (2022.01)

(58) Field of Classification Search
  CPC .. B64U 2201/104; B64U 30/26; B64U 50/19; B64U 50/37; B64U 10/25; B64U 2101/31; B64U 70/20; B64U 70/30; B64U 70/90; G06V 20/17; G06V 20/52; G06V 20/176; G06V 20/13; G06V 10/82; G06V 20/20; G06V 20/653; G06V 2201/07
  See application file for complete search history.

(56) References Cited

U.S. PATENT DOCUMENTS

| | | | |
|---|---|---|---|
| 2016/0144979 A1* | 5/2016 | Su | G09B 9/24 |
| | | | 348/144 |
| 2021/0289265 A1* | 9/2021 | Armstrong | H04N 21/8173 |
| 2022/0138969 A1 | 5/2022 | Forsgren et al. | |
| 2022/0387373 A1 | 12/2022 | Hall | |
| 2023/0153610 A1 | 5/2023 | Fujimura et al. | |

* cited by examiner

DYNAMIC DATA COLLECTION AND SYSTEMATIC PROCESSING SYSTEM

CROSS-REFERENCE TO RELATED APPLICATION

This application claims the benefit of priority under 35 U.S.C. § 119 (e) to prior U.S. Provisional Patent Application No. 63/547,758, filed Nov. 8, 2023, the disclosure of which is incorporated by reference herein to its entirety.

TECHNICAL FIELD

The present disclosure relates generally to dynamic and intelligent data collection and processing. More specifically, the present disclosure relates to a novel and integrated platform that leverages machine learning and artificial intelligence to dynamically collect various types of data from multiple disparate data sources, and systematically process the collected data to deliver real-time and enhanced output, including in real-time, that evolves over time in accordance with changes in observable data in a manner that improves system efficiency.

BACKGROUND

There currently does not exist systems and/or products for intelligently collecting various types of data from various types of data sources, systematically processing that data, and delivering holistic and intelligent solutions to users that are tailor-made for each such user. For example, existing technology in the field of sports performance tracking, particularly in launch monitors and golf simulators, presents limitations that impact both functionality and user experience. Existing launch monitors, for example, are typically high-cost, specialized devices that offer a limited set of functions. While they can capture data on shots, such as ball speed, spin, and launch angle, they lack the ability to analyze this data in a way that is meaningful and personalized for the user. There are currently no devices available that can not only measure shot metrics, but also integrate a comprehensive suite of features, including cumulative statistics tracking, video capture and editing, shot-specific data overlays, and the generation of performance improvement suggestions. This lack of functionality restricts users to simply viewing raw shot data without guidance on technique improvement or the benefit of an enhanced multimedia library that could help visualize their progress.

Similarly, golf simulators present their own set of significant drawbacks. High-end simulators are bulky, expensive, and typically require a permanent setup in large indoor spaces, making them inaccessible for many users. These simulators rely on substantial hardware, including projection screens, tracking systems, and computers, which limits their portability and affordability. The output data from these simulators is often confined to basic shot statistics and lacks advanced, interactive features, such as guidance on club selection or adaptive shot recommendations tailored to a user's personal performance. Consequently, current simulators fail to offer a mobile, cost-effective solution that captures both shot performance data and provides actionable insights for improvement.

Additionally, the existing architectures underlying these devices further contribute to their limitations. Traditional launch monitors and simulators, for example, are designed with specialized hardware and complex optical or radar systems that require controlled environments and physical infrastructure. This architecture inherently restricts the feasibility of a mobile or inexpensive alternative. Current systems cannot leverage mobile devices to deliver the same level of measurement precision, shot analysis, or interactive feedback. As a result, users are unable to achieve the benefits of launch monitor technology and/or simulator functionality in a mobile, flexible, and cost-effective manner.

Further, there does not exist a system architecture that is able to compensate for deficiencies inherent to mobile devices (e.g., limitations on quality/accuracy of image or video capturing features), enhance content delivered by the mobile devices, and return the enhanced content in the format in which the content was received. Further still, there does not exist a system architecture that is able to receive respective content from different types of mobile devices (e.g., having different operating systems, different meta camera specifications, etc.) in different formats, enhance the received content from each mobile device to compensate for the deficiencies specific to each said mobile device, and return the enhanced content to each respective mobile device in the format in which the content was received.

Accordingly, there is a need for a new system, system architecture, methods and computer program products for addressing the deficiencies summarized above.

SUMMARY

A system of one or more computers can be configured to perform operations by virtue of having software, firmware, hardware, or a combination thereof installed on the system that in operation causes the system to perform the operations. The system may include a platform comprising one or more servers, the one or more servers may include one or more processors, a memory and computer-readable instructions that, when executed by the one or more processors, cause the platform to generate an interactive graphical user interface (GUI) for display on a user device; receive, via the interactive GUI, one or more cadence parameters and input defining a mode of play selection; automatically initiate an object detection sequence based on the one or more cadence parameters; automatically initiate a video recording of an object for a predetermined period of time that commences when the object detection sequence detects the object; receive, from the user device, the video recording of the object; and initiate back-end processing of the video recording of the object. The back-end processing may include deriving metrics relating to a flight path of the object and creating a trace line of the flight path by synthesizing video frames from among the video recording that include said flight path.

In an embodiment, a system includes a platform that may include one or more servers, the one or more servers may include one or more processors, a memory and computer-readable instructions that, when executed by the one or more processors, cause the platform to receive, from a user device, a video recording may include a flight path of an object and initiate back-end processing of the video recording of the object. The back-end processing may include data modeling to construct a combination of directories, folders, file names, attributes, labels and data connections for data to pass between two or more back-end processes; object detection operations to identify object dimension data, object location data and timestamped data sets relating to the object for each video frame of the video recording; normalizing the object dimension data, object location data and timestamped data sets to create normalized data; adjusting the normalize data based on meta_camera specifications associated with the user device to create adjusted data; and applying mathematical techniques to the adjusted data to derive one or more metrics relating to the flight path of the object. In an embodiment, the back-end processing may further include generating a trace line of the flight path of the object; adding the trace line to a video clip derived from the video recording to create an enhanced video clip; transmitting the enhanced video clip and the one or more metrics relating to the flight path to the user device; and storing the enhanced video clip and the one or more metrics relating to the flight path in back-end storage.

Implementations of the described operations may include hardware, a method or process, or computer software on a computer-accessible medium.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals may have been used, where possible, to designate identical elements that are common to the figures. It is contemplated that elements disclosed in one embodiment may be beneficially utilized on other embodiments without specific recitation.

DETAILED DESCRIPTION

Figure 1:
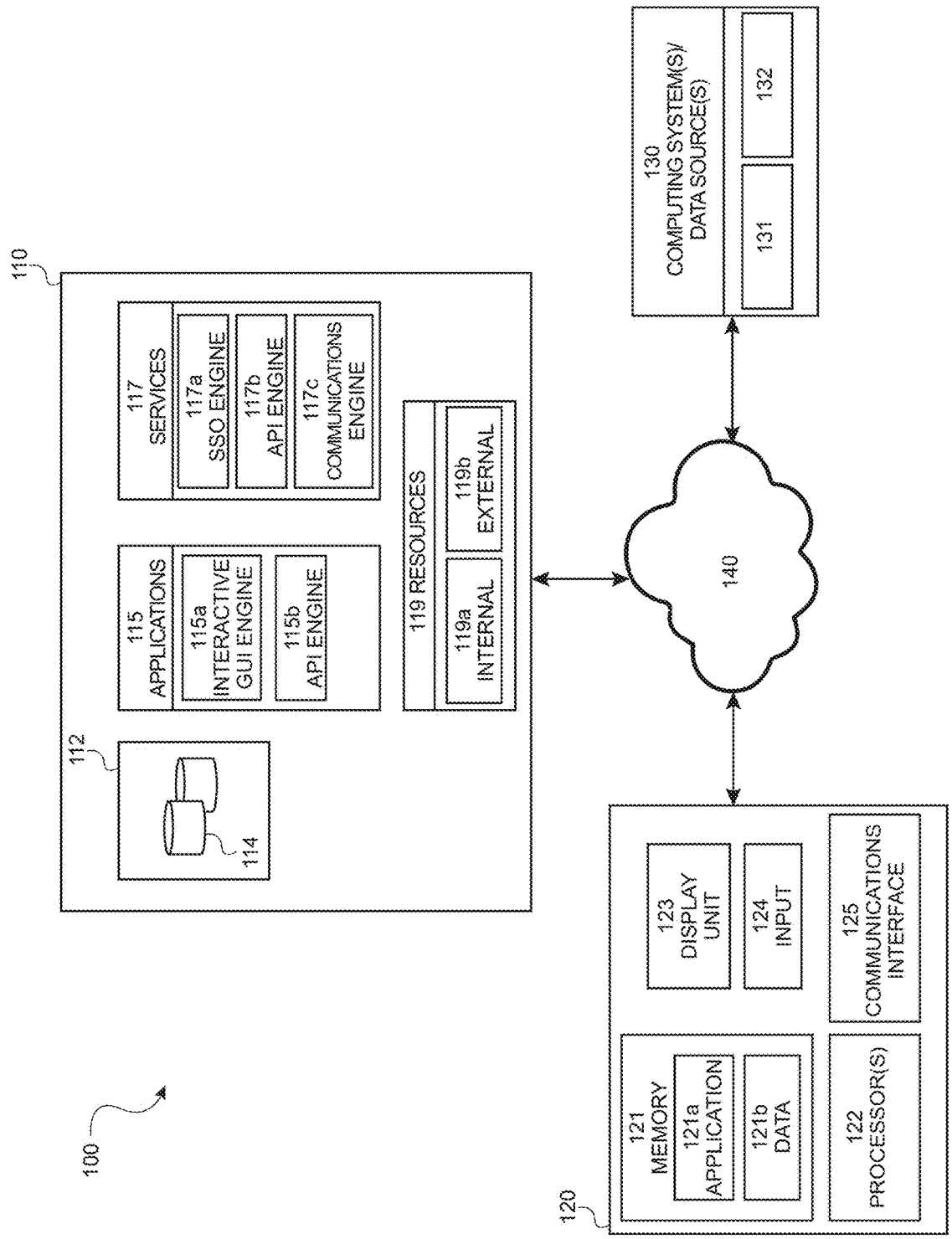
FIG. 1 is a diagram of an exemplary system according to an embodiment of the present disclosure.

The present disclosure generally relates to systems, methods and computer program products for intelligently collecting various types of data from various types of data sources, systematically processing that data, and delivering holistic and intelligent solutions to users that are tailor-made for each such user. More particularly, the present disclosure addresses the deficiencies summarized above by presenting an innovative solution that transforms a standard mobile device into a versatile launch monitor, simulator, and more. This new technology captures comprehensive shot metrics, edits and catalogs video clips with shot-specific analytics, accumulates statistics, and leverages advanced modeling to provide personalized improvement suggestions and strategic shot recommendations. In addition, the new technology described herein enables users to experience the functionality of a launch monitor, a simulator, a virtual trainer, an automated video editor and enhancer, and other resource-intensive applications and services, all on a mobile platform, overcoming the limitations of current devices by combining high accuracy, high-efficiency, cross-compatibility, affordability, and mobility into a single, cohesive solution.

The foregoing is made possible, at least in part, by a new and robust system architecture specifically configured to support the operations and functions described herein, while also overcoming deficiencies of existing architectures and improving operating efficiencies across multiple system components and devices. Indeed, the system architecture described herein leverages back-end processing to offload resource-intensive functions and operations from the system's front-end, thereby preserving front-end resources while also providing users with a streamlined, seamless user experience. For purposes of this disclosure, the term system may be interpreted as comprising a computer platform.

In some aspects, the technology solutions described herein not only account for each user's particular tendencies, preferences and objectives, but they also account for any number of other parameters that may impact and/or influence each user's optimal solution(s). Such parameters may include (without limit) size, weight, and type of equipment a user is utilizing, weather conditions (e.g., temperature, wind, precipitation, humidity, etc.), terrain on which the user is operating (e.g., flat surface, grassy surface, sloped surface, sandy surface, mixed surface, etc.), geographic location of the user, and so on. As will be discussed further below, the architecture described herein leverages the power of multiple independent data and operating resources, as well as that of machine learning and artificial intelligence (among other technologies), to efficiently model and continually improve solutions delivered to each user, such that the more a user engages with and utilizes aspects of the present disclosure, the more robust, accurate and impactful are the solutions said user receives.

Observations (i.e., observational data) of any kind can logically fall into one of several broad categories (1) memorable, (2) forgettable, and (3) typical, for instance. In any circumstance, one must first "observe" an observation, before they can effectively label the observation, and subconsciously assign it as memorable, forgettable, or typical. Processing, analyzing, correlating, classifying, organizing, storing, editing, and replaying those observations intelligently and efficiently—while generating a compelling set of derived outputs, including predictive output and recommendations for an "observer" to consider in their assessment of the observation(s)—is one way to broadly describe certain aspects of the present disclosure. Other aspects of the present disclosure may broadly be described as a new and unique architecture that facilitates the aforementioned operations and functions, while simultaneously improving operating efficiencies.

For illustrative purposes, the present disclosure will be descried in the context of sport-based implementations, and most prominently, the sport of golf. It should be understood, however, that the present disclosure is not limited thereto. To the contrary, the systems and methods described herein are applicable to any number of implementations and/or industries that would benefit from the delivery of robust and intelligent (e.g., AI-based) outputs, including in real-time on a mobile platform, that account for all or nearly all relevant factors, conditions, attributes, parameters, tendencies, etc. associated with observational data, and that is able to adapt (e.g., learn) and improve such outputs over time. As will be appreciated, the possible use cases and implementations are nearly endless.

The world of sports provides us with a wide range of observational data to consider processing. Athletes, for example, are continually seeking ways to improve their play and performance by examining their mechanics, equipment, and other factors that may impact their performance. In the game of baseball, for instance, a player may want to analyze a series of at-bats (observations), perhaps hundreds or thousands, to discern their swing tendencies against different types of pitches (fastball, curveball, change-up, splitter, etc.) across the spectrum of pitchers (category of observations) they have faced, under certain conditions (e.g., windy, rainy, night game in October, afternoon game in July, etc.).

Pitchers, on the other hand, may be focused on the speed and accuracy of their pitches (observations), including an assessment of their biomechanics (wind-up routine, release point, etc.) leading to successful or unsuccessful results. In this use case, a pitcher's "results" can fall into any number of discrete categories, such as strikes, balls, speed, pitch type, location result, swing-and-miss, etc. Results can also be further defined to categorize the most important pitch of an at-bat, the final one, which reveals the association of that pitch to the batter's result. As the pool of observations grows over time, more intelligence can be exposed in the form of deciphering central tendencies, perhaps pitch type selection based on the current disposition or "count" of an at-bat (e.g., the number of balls and strikes thrown to a hitter to whom the pitcher is pitching), to infer yet another set of tendencies. In essence, properly capturing and processing sets of observations can yield an assortment of beneficial insights (e.g., 'outputs') for an interested observer.

Currently, there does not exist a system architecture (or other means) for effectively and efficiently capturing and/or processing various types of raw observational data that may be provided to an observer to discern insights, nor the ability to generate such insights (e.g., output), particularly in a dynamic environment with changing conditions. Further, there is no system architecture configured to provide feedback to continually update and improve the insights by continuing to capture and process even more observational data, for example. Further still, there are no existing system architectures specifically configured capture and process large amounts of data-intensive observational data, as described herein, in a manner that is both efficient and that improves system performance. Moreover, there certainly is no system architecture configured to provide a mobile, efficient, and cost-effective solution that provides the feature and functions outlined above.

Having recognized the foregoing (and other) deficiencies, the present disclosure describes a new type of platform built on a new type of architecture that efficiently captures, processes and normalizes large volumes of observational data to provide valuable, real-time insights, all on a mobile platform.

As noted above, the possible use cases and implementations of the technology described herein are virtually limitless. Nonetheless, for illustrative purposes, aspects of the present disclosure will be described in the context of the game of golf, as noted above. In that context, the technology described herein includes a platform that enables users (e.g., users, golf instructors, etc.) to view and analyze their golf shots and/or the golf shots of others (e.g., of their students), with system-generated insights and analytics. Indeed, the platform is configured to efficiently perform a variety of actions and processes, including capturing (e.g., recording) observational data (a.k.a., 'observations'), processing, normalizing, analyzing, correlating, classifying, organizing, storing, distributing, editing, and replaying those observations, from the user's own device (e.g., mobile phone device), as well as generating intelligent recommendations, predictions and other visual insights (e.g., videos, statistical charts, etc.) for presentation to the user via the user's own device.

In addition, and contrary to existing technologies, the platform described herein is configured to perform its actions and operations without having to disturb or interrupt the user whose activities are being capture. That is, users engaged in activities that produce multiple, consecutive observations (e.g., a string of consecutive golf swings) can do so without having to interrupt the activities to initiate or activate the platform. To the contrary, the platform of the present disclosure is configured to initiate its capture, processing, and other functions automatically and intelligently, so as to provide a seamless experience for the user while also improving the overall operating efficiency of the platform.

As discussed further below, the platform described herein may serve as a utility to record, measure, determine and store performance metrics and statistics, providing users with an invaluable tool to analyze and improve their performance (e.g., their proficiency level across clubs, across venues and under varying conditions). By analyzing a user's biodynamics, swing path, ball striking, club speed, etc., for example, and then connecting that data to the user's shot results, the user may be equipped with a data-driven approach to self-awareness and personal improvement.

Notably, the utility of the platform extends well beyond the point of recording observational data. For example, users (in some examples, golfers) can navigate through the platform (e.g., as a mobile application downloaded onto the user's mobile phone device, via a web portal, etc.) to watch shot replays, review result statistics over time, and tag "favorites" or "model shot" by club-organized and packaged in an organized/indexed manner (referred to herein as a "Clubadex" feature of the platform, discussed below)—for case of replay, sharing, or informing their next training and/or playing strategy. In addition, users may consider suggestions (e.g., recommended training activities) generated and provided by the platform for improving their respective performances.

The platform described herein may also be configured to provide key insights (and other output) that enables users to maximize their practice sessions and observations. For example, users are continually striving to refine their craft, especially with respect to conditioning a target-based approach to ball strikes. When purchasing a bucket of balls, for example, each stroke represents invaluable data that may be used by the platform to help the golfer improve. As a result, rather than indiscriminately "smacking a few balls around," each golf stroke may be carried out with an intention of producing the type of observational data that may be utilized to improve a particular area of a user's game (e.g., accuracy/hitting a target, improving consistency, increasing distance, etc.). The platform described herein helps capture and extract insights from each stroke by recording stroke results, intelligently editing the results, analyzing the results, summarizing performance, and leveraging statistics analysis to assist the user in understanding and interpreting performance.

The platform described herein is also able to assist users in determining how they should practice by determining a set of training programs or regimens that may be specific to each user and/or that may be universally applicable to any user. As further discussed below, a user's cadence (or tempo) is a key to both efficiently capturing observational data of that user and to generating training programs that that are impactful and useful for the user.

The platform if the present disclosure may also be configured to determine each user's cadence (e.g., based on prior observational data) and/or to receive user input directing and adjusting their respective cadence parameters. As will be appreciated, engaging in routines, particularly those developed and provided by the platform, serve to offer a purpose for each shot, while the resulting "interpreted information set" may be geared towards informing a user's strategy and approach to executing their strategy when it counts the most-on game day the next time they set foot on a golf course and tee up. To that end, the platform described herein generates self-awareness for each user to identify strengths and weaknesses, improving confidence and decision-making on the course, and ultimately improving scoring performance.

In some aspects, the platform described herein may be configured to leverage a user's own user device to record and process the user's observational data (e.g., a user's golf shots and/or other related movements). To that end, the platform may also be configured to leverage the user device's image and video capture features to feed the platform's automated video image processing functionality (discussed below). The platform may then be configured to apply artificial intelligence (AI) and/or machine learning (ML) processes and mathematical techniques to determine (among other things) impact time, impact angle and impact speed between a golf club and golf ball, ball trajectory, ball deceleration, ball location, ball distance traveled, and other useful metrics that may be used to identify trends, areas of improvement, effectiveness of training techniques, and so on. Similarly, the platform may utilize AI/ML processes and mathematical techniques to identify and/or predict a user's swing tendencies, a model swing for the user (e.g., based on the user's biomechanics, based on a user's own input, etc.), areas of improvement, effectiveness of training techniques, model club(s) that are suited for the user's swing, etc. based on the user's measured swing path dynamics, swing speed, swing acceleration, head motion, body motion, the user's own input (e.g., labeling a swing as "ideal"), etc.

In addition, the platform may utilize a combination of observed and/or determined biomechanical data, shot metrics and user input to identify associations between the user's swing tendencies and the user's shot performance, equipment effectiveness, etc. With this information, the platform may determine and suggest training regimens to improve the user's biomechanics, consistency, accuracy, etc., and ultimately, the user's overall performance. Further, the platform may determine and suggest in-game strategy to the user's, such as which club to use next in a given or current set of conditions (e.g., based on distance to a pin, surface on which the ball lies (e.g., fairway, sand trap, etc.), weather conditions (e.g., temperature, wind speed, etc.), moisture in the air, dew on grass, length of time the user has been playing, number of swings already taken, etc.).

System Architecture

Turning now to FIG. 1, a diagram of an exemplary system 100 according to the present disclosure is shown. The exemplary system 100 includes a platform 110 which may include a combination of front-end and back-end applications 115, services 117 and resources 119. In some embodiments, the back-end applications 115, services 117 and resources 119 may be cloud-based, accessible through front-end services 117, for example.

In addition, the exemplary system 100 of FIG. 1 may include one or more user devices 120 and one or more third-party computing systems/data sources 130. Each of the platform 110, the one or more user devices 120 and the one or more third-party computing systems/data sources 130 may be operatively connected to, and interconnected across, one or more communications networks 140. Examples of communications networks 140 may include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet, Bluetooth™, low-energy Bluetooth™ (BLE), ZigBee™, ambient backscatter communication (ABC) protocols, and so on. In some embodiments, communications between or amongst the platform 110, the one or more user devices 120 and/or the one or more third-party computing systems/data sources 130 may be encrypted and/or secured by establishing and maintaining one or more secure channels of communication across communications network(s) 140, such as, but not limited to, a transport layer security (TLS) channel, a secure socket layer (SSL) channel, or any other suitable secure communication channel.

The platform 110, may include one or more servers and one or more tangible, non-transitory memory devices storing executable code, software modules, applications, engines, routines, algorithms, computer program logic, etc. Each of the one or more servers may include one or more processors, which may be configured to execute portions of the stored code, software modules, applications, engines, routines, etc. to perform operations consistent with those described herein. Such operations may include, without limitation, integrating and linking the platform 110 to any number of upstream and downstream systems, user devices and/or data sources, monitoring and extracting data and information therefrom, executing one or more artificial intelligence (AI)/machine learning (ML) algorithms to develop user-specific product suggestions, predictions, notifications, etc., providing authentication services, and so on. For example, as described herein, the platform 110 may be configured to execute operations associated with providing predictive and real-time intelligence (e.g., swing analytics, club selection, etc.), enhanced standardized-edit video clips, composite shot summaries, club-specific shot analytics, cross-club analytics, automated assistance, topography analysis, and others, all accessible via a user device 120.

The executable code, software modules, applications, engines, routines, algorithms, etc. described herein may comprise collections of code or computer-readable instructions stored on a media (e.g., memory of the platform 110) that represent a series of machine instructions (e.g., program code) that implements one or more steps, features and/or operations. Such computer-readable instructions may be the actual computer code that the processor(s) (not shown) of the platform 110 interpret to implement the instructions or, alternatively, may be a higher level of coding of the instructions that is interpreted to obtain the actual computer code. The software modules, engines, routines, algorithms, etc. may also include one or more hardware components. One or more aspects of an example module, engine, routine, algorithm, etc. may be performed by the hardware components (e.g., circuitry) itself, rather as a result of the instructions.

Although the platform 110 of FIG. 1 is shown as comprising a discrete computing system, it should be understood that platform 110 may correspond to a distributed computing system having multiple computing components (e.g., servers) that are co-located or linked and distributed across one or more computing networks, and/or those established and maintained by one or more cloud-based providers. Further, platform 110 may include one or more communications interfaces, such as one or more wireless transceivers, coupled to the one or more processors for accommodating wired or wireless internet communication across the one or more communications networks 140 with other computing systems and devices (e.g., user device(s) 120, third-party computing system(s)/data source(s) 130, etc.) operating within a computing environment.

As described herein, platform 110 may be configured to perform any of the exemplary functions and/or processes described herein to, among other things, host, store, maintain and operate applications 115 and services 117 for intelligently collecting various types of data from various types of data sources, systematically processing that data, and delivering holistic and intelligent solutions to users via user device(s) 120 that are tailor-made for each such user. In some embodiments, the platform 110 may be configured to obtain and/or develop comprehensive shot metrics, edit and catalog video clips with shot-specific analytics, accumulate statistics, and leverage advanced modeling to provide personalized improvement suggestions and strategic shot recommendations to users. To that end, the platform 110 enables users to experience (among others) the functionality of both a launch monitor and simulator via their user device(s) 120, thereby overcoming the limitations of current systems and devices by combining system efficiency, high accuracy and mobility into a single, cohesive solution.

Additionally, the platform 110 may be configured to receive, generate and/or compile information or data associated with one or more users. Such data and information may be stored, maintained and/or access from a data repository 112 comprising one or more databases 114, for example. Examples of such data and information may include, for example, user-specific data such as a user's name, account information, login credentials, user preferences, user parameter settings, user images and video clips (e.g., processed and aggregated by the platform 110), platform-developed training suggestions and content, user-inputs, queries, types of platform 110 features and functions initiated, reactions/inputs responsive to platform 110 output/suggestions, type of data downloaded and/or uploaded, etc.), user tendencies (e.g., as determined by the platform 110), and so on. This user-specific data may be provided or generated via the user devices 120 and/or by the platform 110 itself, as discussed below.

Data and information may also originate and/or be obtained from other sources, such as the one or more of the third-party computing systems/data sources 130. Examples of such data and information may include, for example, geo-location of a user, the user's device 120 (e.g., golf course, hole, etc.) and/or the user's equipment (e.g., location of golf ball after being struck), topography and layout data of any number of golf courses, weather conditions (e.g., wind conditions, air pressure, altitude, temperature, amount of dew on greens, etc.), and so on.

As indicated above, the platform 110 may also include, within the one or more tangible, non-transitory memory devices, any number of applications 115, services 117 and resources 119 for facilitating the performance of any of the processes and functions described herein. The applications 115 may include, for example, one or more modules, engines, etc., such as an interactive graphic user interface (GUI) engine 115a and an artificial intelligence (AI) engine 115b. The applications 115 may further include one or more other applications, modules, engines, etc. (not shown) that may be accessed and executed to provide users with certain additional features and functions (discussed further below).

The interactive GUI engine 115a may be configured to generate and dynamically update an interactive GUI that may be rendered on the one or more user devices 120. As discussed further below, the interactive GUI may be configured to provide an interactive and adaptive point of access to all services, functions, resources, applications, data, etc. provided directly or indirectly by the platform 110.

The AI engine 115b may be configured to generate, train, validate, test, execute, evaluate, re-train and re-execute one or more AI models, based on current and/or historic user data (e.g., including data relating to one or more users having similar profile characteristics, for example), to develop advanced performance/tendency analytics, predict and suggest next best action or activities based on the analytics (e.g., use this club for your next shot, develop a training session to improve a particular area of the user's performance, etc.), and generate and/or revise platform-generated predictions and suggestions aimed at improving a user's performance. This may include, for example, generating and revising user-specific training sessions to reflect improvements in the user's performance, for example. The AI models may also be leveraged to improve the effectiveness and accuracy of image/video capturing and processing features of the system 100 (e.g., video recording device within user devices 120) that are otherwise limited by their inherent deficiencies. As further described below, a series of modeling techniques may be utilized to clean, enhance or otherwise normalize video frame data so as to produce images and video clips that are even more accurate than those captured by a user device 120.

For purposes of this disclosure, the term "AI" broadly refers to artificial intelligence and may include generative AI, machine learning (ML), and other subsets or types of AI. The term "AI model(s)" shall refer to any combination of AI algorithms, including generative AI, machine learning, statistical modeling techniques (e.g., Bayesian statistics) or any other sub-category of AI algorithms/modeling techniques. The AI models described herein may be configured (among other things) to model and analyze user-related data and information, images, videos, video clips, location and condition data, user input data, modeling output, and so on to develop real-time performance metrics, convert performance metrics into dynamic image overlays, efficiently edit, catalog and store video clips, provide personalized improvement suggestions and strategic shot recommendations, etc., as discussed herein.

The AI engine 115b may be operatively coupled to one or more components of the platform 110, including system storage device(s) 114, platform applications 115, services 117 and resources 119, as well as external components such as user devices 120 and third-party computing systems/data sources 130. As a result, the AI engine 115b may be configured to receive, directly or indirectly, data and information from any number of sources, and in turn, initiate and execute one or more of the operations described herein. In some embodiments, the AI engine 115b may also be configured to continually refine its AI models based on, for example, user input, learned user tendency data, and so on (discussed below).

The type and quantity of AI models that may be executed by the AI engine 115b, as well as the techniques used to train and re-train the AI models, may dynamically be determined by the platform 110 according to any number of factors (e.g., model use case, instructions or data received from one or more other components of the platform 110, quantity and quality of collected data, prior AI modeling results, type and source of collected data, etc.).

In some embodiments, the one or more AI models may include one or more generative AI models, and the one or more generative AI models may include one or more large language models (LLMs) incorporated therein. As will be appreciated, the one or more LLMs may be configured to process or model text-based input, while other specialized models included in the generative AI models may be executed to process or model other types of data. Collectively, the generative AI models may be executed to process and model various types of input data, and in response, generate content or output having various data types. This may include, for example, generating text and image-based content (e.g., dynamic graphical images that are representative of a user's golf stroke, the flight of a golf ball, etc.) for display via the interactive GUI In some embodiments, the AI engine 115b may further invoke a RAG (Retrieval-Augmented Generation) process, which comprises retrieving and providing grounding data to the LLMs from one or more external data sources (e.g., independent pricing data). This grounding data may then be utilized by the LLMs to formulate more accurate, contextualized content and output. In some embodiments, the sources of such grounding data may be selected, preselected, and/or updated according to any number of parameters.

In some embodiments, the AI engine 115b may be configured to process data and input provided in a natural language format, and initiate one or more responsive commands to initiate action by the AI engine 115b and/or other components of the system 100. To do this, the AI engine 115b may invoke natural language processing (NLP) to interpret the input, and a converter to convert the interpreted input into the one or more commands. In some embodiments, the one or more commands may include executing one or more AI models, updating one or more datasets, updating information displayed via the interactive GUI. For example, in response to input provided via the interactive GUI in a natural language format (e.g., a user instructional command to retrieve shot statistics), the AI engine 115b may leverage NLP to interpret the input and generate one or more commands to execute one or more AI models and to display content generated by the AI models via the interactive GUI. In some embodiments, the NLP may itself comprise executing one or more LLMs discussed above, for example.

In some embodiments, the platform 110 may initiate one or more actions automatically, without receiving user input, upon the occurrence of one or more predefined events and/or the existence of one or more predefined conditions as defined by the user and/or as learned or determined by the platform 110. Such events or conditions may include, for example, identifying a change in weather conditions on a golf course, determining an improvement (or decline) in user performance or swing motion, identifying a change to pin location, identifying corrupt or missing data from image/video recordings received by the platform 110, and so on. Examples of responsive automated actions may include, for example, generating a notice for display via the interactive GUI, executing one or more AI models to re-generate suggested training regimens or recommended equipment (e.g., suggested club for a next shot), etc. To do this, the system may invoke a monitor (and/or monitoring function(s)) to monitor changes to user activity, user inputs, user performance, geo-location information, etc. The monitor function may then feed results of the monitoring to the AI engine 115b as input, which may in turn execute one or more AI models to determine if and when to initiate the automated actions. Notably, the AI models executed by the AI engine 115b may be trained and re-trained using certain threshold parameters, weights, etc. to recognize and identify the occurrence and existence of the types of events and conditions that trigger such automated actions.

In some embodiments, the user may provide as input preference data that defines (among other things) the events and conditions under which the system 100 may automatically initiate one or more platform 110 actions. In some embodiments, the system 100 may learn user preferences by monitoring and capturing user interactions with the platform 110. The user interactions may include (without limitation) real-time and/or historic user input (e.g., selections, requests, queries, responses to prompts, etc.), as well as sentiment data, which may include user input that may be indicative of the user's reaction to platform-generated output, displays, suggestions, etc.

In addition to generative AI model(s), the AI engine 115b may comprise, generate, train, re-train, validate, test and/or execute other types of models, such as those configured for supervised and/or unsupervised machine learning, according to the particular use case and its requirements. For purposes of this disclosure, supervised machine learning involves training AI models using labeled datasets (e.g., input data that has been paired with desired output data), from which the AI models may learn the mapping or relationship between the inputs and outputs and make predictions or classifications when presented with new, unseen data. For example, supervised machine learning tasks may include regression (i.e., predicting continuous values), decision trees e.g., for categorizing data into classes), neural networks, and others.

Conversely, unsupervised machine learning refers to training the AI models using unlabeled datasets. As a result, unsupervised machine learning identifies patterns, structures or relationships inherent to the data, without predefined labels or any output expectations. For example, unsupervised machine learning tasks may include clustering (e.g., k-means, hierarchical, etc.) for grouping similar data, dimensionality reduction (i.e., extracting essential features), and others.

In some use cases, the AI engine 115b may execute a combination of supervised and unsupervised AI models. For example, as it relates to detecting anomalies in data, the AI engine 115b may execute one or more unsupervised machine learning models to identify the anomalies and/or gaps in data, and one or more supervised machine learning models to classify the anomalies and/or gaps. To illustrate, one or more unsupervised machine learning models may be executed to identify outliers in a video recording of the golf ball's flight path, such as irregularities in the size, shape and/or location of a golf ball during its flight path, unexpected changes in a trajectory or direction of the golf ball's flight path (e.g., bouncing off of a tree), and/or gaps in a golf ball's flight path (e.g., as a result of an obstruction or a smudge on a camera lens), and then execute one or more supervised machine learning models to classify the data as outlier data that may be excluded from further processing. For missing data, such as gaps in a golf ball's flight path, one or more AI models may be executed to interpolate the existing data to fill in any missing gaps (e.g., fill in the flight path gaps of the ball). Notably, the one or more unsupervised and/or supervised machine learning models may be further executed to distinguish the outlier data from data that is reflective of a user's performance, despite being irregularly high or low. In some embodiments, users may specify policy, weight and other parameter settings across any number of parameters which could then be used by the AI engine 115b to identify anomalies and/or irregularities, and in response, automatically refine the data accordingly, as noted above.

In order to train the AI models described herein, the AI engine 115b may collect (e.g., directly or through other platform 110 components) historic and/or current (real-time) data and information and aggregate the same to create training data. The training data may originate from within the platform 110 (e.g., internal data) and/or from external data sources (e.g., external data). In some embodiments, the training data may also include prior (or current) output generated by one or more of the AI models themselves.

In some embodiments, the training data may be pre-processed, which may include (among other operations) removing corrupted data, augmenting the data (e.g., adding labels, annotating, etc.), resolving and/or replacing missing and/or corrupted data values (e.g., smudged image frames), filtering, formatting/re-formatting, weighting and/or otherwise normalizing the data, as discussed above. In some embodiments, portions of the training data may be utilized as collected, without pre-processing.

Once the training data is pre-processed (if necessary) or otherwise made available, the AI engine 115b may utilize the training data to train respective AI models. Training the AI models may include generating a training data set from among the training data. In some embodiments, this may include dividing the training data into multiple datasets, each dataset for use in training, validating and/or testing the respective AI models. For example, a first portion of the training data may be utilized to create a training data set. This training data set may then be fed into one or more of the AI models to identify patterns and relationships in the training data by solving one or more objective functions, where each objective function may comprise one or more parameters. The patterns and relationships identified during training may include, for example, market/industry tendencies, interdependencies between variables, user sentiment (e.g., to AI generated output), user preferences, and the like.

A second portion of the training data may be utilized to create a validation data set, which may then be used to measure a performance of the respective AI models according to one or more performance metrics. That is, output generated by the respective AI models during training may be measured against the validation data set for accuracy (or any other performance metric). If the measured performance is unsatisfactory, one or more parameters of the objective function(s) may be adjusted and the performance re-measured. This process may be iterative and continue until the performance is deemed satisfactory (e.g., meets or exceeds the one or more performance metrics).

Following training, a third portion of the training data may be utilized to create a test data set to test the respective AI models. This may include, for example, applying a trained model to a simulated environment and/or data set, and measuring its effectiveness in one or more scenarios in view of the training dataset.

The trained, validated and/or tested AI models may then be executed to achieve their respective and/or collective objectives. Example objectives for the AI models may include identifying outliers in collected data, as noted above, edit image/video captures, correlate user performance with the user's biomechanical movements, develop swing analytics and statistics, identify training regimen activities to improve user performance, etc.

Results or output of the AI models may then be presented to a user (e.g. via an interactive GUI on the user's device 120), together with alerts, notifications, etc. In some embodiments, the user may submit (e.g., via the user's device) input to the platform 110 that is responsive to the AI model-generated results or output. The responsive input may include, for example, natural language text, feedback input (e.g., acceptance or denial), or other forms of sentiment or reactionary input. This sentiment or reactionary data may then itself be modeled (e.g., via one or more AI models) and/or utilized to create one or more new training data sets. The new training datasets may comprise a combination of current and/or historic sentiment/reactionary data, and one or more of the training data sets previously utilized to train the AI models. In some embodiments, the sentiment/reactionary data may be combined with historic training data, historic sentiment/reactionary data, and/or additional current (real-time) and/or historic data to create a new corpus of training data, which may then be utilized to create the new training data sets, new validation data sets and/or new testing data sets. The new training data sets may then be utilized to re-train and/or otherwise update the AI models, as discussed above.

The platform 110 may also comprise any number of services 117 to facilitate its operations, such as (among others) a single sign-on (SSO) engine 117a, an application program interface (API) engine 117b and a communications engine 117c. The SSO engine 113a may be configured to perform authentication services and functions in connection with granting access to the platform 110, as well as to services, resources and functions provided by and/or accessed through the platform 110.

The API engine 117b may be configured generate any number of application program interfaces (APIs) to enable communications between applications (e.g., software programs, modules, engines) 115, services 117, resources 119, etc., including those within the platform 110 and those from external sources (e.g., user devices 120, third-party computing systems/data sources 130, etc.). In some embodiments, the API engine 117b may be configured to refresh one or more request/response and/or event-driven APIs in real-time or near real-time, so as to provide seamless access to any of the applications 115, services 117 and/or resources 119 described herein.

The communications engine 117c may be configured to generate and transmit automated notifications, alerts, messages, video clips, graphical images, statistics etc., in real-time or near real-time, to any of the one or more user devices 120 (e.g., via the platform-generated interactive GUI) and the third-party computing systems/data sources 130.

The resources 119 may include a combination of an internal resources engine 119a and an external resources engine 119b. The internal resources engine 119a may be configured to generate, maintain and/or provide access to one or more internal resources, such as any physical or virtual components within the platform 110. Internal server components and connected devices, as well as virtual components such as files, network connections, memory, etc., may also be referred to as internal resources. Examples of internal resources may include databases and connections (e.g., network connections) that facilitate access to external resources and/or that may provide information and/or services directly to user devices 120 (e.g., content from an external system, for example, any of the third-party computing systems/data sources 130, large and small language models (LLM/SLMs), communication channel services, etc.).

The external resources engine 119*b* may be configured to generate, maintain and/or provide access to one or more external resources though direct integrations or real-time or near real time API connectivity. For purposes of this disclosure, external resources may include any combination of products, data and/or service offerings provided by one or more independent systems or networks (e.g., third-party computing systems/data sources 130). External resources may include cloud-based services, as well as other types of services. Examples of external resources may include, for example, communication services (e.g., text messaging, telephone services, group conferencing, etc.), scheduling services (e.g., for tee times), document services (e.g., document generation and transmission, personalized document creation/editing, document sharing, etc.), knowledge-based services (e.g., search engine, video libraries, AI/ML modeling services, etc.), and others.

In some embodiments, the external resources engine 119*b* may be configured to deliver external resources directly to a user device 120, to be accessed via an interactive GUI. In some embodiments, the internal resources engine 119*a* may facilitate indirect access to external resources. In other words, the internal resources engine 119*a* may cause one or more internal resources to access one or more external resources, and in turn, deliver the one or more external resources to a user device 120 for access via an interactive GUI. User entitlements, permissioning and security configuration of underlying internal and external systems may dictate access to the platform's 110 internal and external resources.

As indicated above, access to a combination of internal and external resources may be facilitated by the one or more digital gateways and/or service portals generated by the platform 110. In some embodiments, the one or more user devices 120 may directly access internal and/or external resources using a single log-in procedure facilitated by the SSO engine 117*a*.

The one or more user devices 120 of the exemplary system 100 may each comprise one or more tangible, non-transitory memory devices 121 that stores software instructions 121*a* and/or data 121*b*, and one or more processors 122 configured to execute the software instructions 121*a*. The one or more tangible, non-transitory memory 121 may, in some examples, store application programs, application engines or modules, and other elements of code (collectively, 121*a*) executable by the one or more processors 122. As illustrated in FIG. 1, the one or more user devices 120 may store within the one or more tangible, non-transitory memory 121, an executable application 121*a*, which may be provisioned to any of the one or more user devices 120. The executable application 121*a* may, when executed, provide the one or more user devices 120 with access one or more applications 115, services 117 and/or resources 119 of the platform 110, including via an interactive GUI.

In some embodiments, the executable application 121*a* may be supported by the platform 110. Upon execution by the one or more processors 122, the executable application 121*a* may provide the one or more user devices 120 with access to one or more applications 115, services 117 and/or resources 119 of the platform 110, via the platform-generated interactive GUI. This may include, among other things, displaying the interactive GUI on a display unit 123 of the one or more user devices 120, establishing communications between the platform 110 and the one or more user devices 120, transmitting user data (e.g., user input) or other data and information from or to the platform 110 and/or to other systems or devices (e.g., third-party computing systems/data sources 130), etc.

Each of the one or more user devices 120 may include a display unit 123 configured to present interface elements to a corresponding user, and an input unit 124 configured to receive input from the corresponding user (e.g., in response to the interface elements presented through the display unit 123). In some examples, the display unit 123 may include, but is not limited to, an LCD display unit, a thin-film transistor (TFT) display, organic light emitting diode (OLED) display, a touch-screen display, or other type of display unit 123, and input unit 124 may include, for example, a keypad, keyboard, touchscreen, fingerprint scanner, voice activated control technologies, biometric reader, camera, or another type of input unit 124.

In some embodiments, the functionalities of the display unit 123 and input unit 124 may be combined into a single device, such as a pressure-sensitive touchscreen display unit that presents interface elements and receives input from a user. In some embodiments, at least one among the one or more user devices 120 may include an embedded computing device (e.g., in communication with a smart textile or electronic fabric), or any other type of computing device that may be configured to store data and software instructions, execute software instructions to perform operations, and/or display information on an interface device or unit.

The one or more user devices 120 may also include a communications interface 125, such as a wireless transceiver device, coupled to one or more processors 122 and configured to establish and maintain communications with communications network 140 via one or more communication protocols, such as WiFi®, Bluetooth®, NFC, a cellular communications protocol (e.g., LTE®, CDMA®, GSM®, etc.), or any other communications protocol. In some embodiments, the one or more user devices 120 may also establish communications with one or more additional computing systems (e.g., third-party computing systems/data sources 130) or devices (e.g., others among the one or more user devices 120) operating within the system 100 across a wired or wireless communications channel, such as communications network 140 (e.g., via the communications interface 125 using any appropriate communications protocol).

Examples of the one or more user devices 120 may include, but are not limited to, any combination of mobile phones, smart phones, tablet computers, laptop computers, desktop computers, server computers, personal digital assistants, portable navigation devices, mobile phones, smart phones, wearable computing devices (e.g., smart watches, wearable activity monitors, wearable smart jewelry, glasses and other optical devices that include optical head-mounted displays (OHMDs)), embedded computing devices (e.g., in communication with a smart textile or electronic fabric), or any other computing device configured to capture, receive, store and/or disseminate any suitable data.

The one or more third-party computing systems/data sources 130 may include one or more servers (not shown) and one or more tangible, non-transitory memory devices (not shown) storing executable code, application engines, and/or application modules. Each of the one or more servers may include one or more processors, which may be configured to execute portions of the stored code, application engines or modules, and/or application programs to perform and/or provide one or more external applications, external services and/or external resources that may be accessed by the platform 110. In some embodiments, the external applications, external services and/or external resources may be cloud-based.

The one or more third-party computing systems/data sources 130 may include, within their respective one or more tangible, non-transitory memory devices, a data repository 131 that includes one or more databases and/or storage devices. The one or more third-party computing systems/data sources 130 may also include, within the one or more tangible, non-transitory memory devices, a respective applications repository 132 to facilitate the provision and execution of one or more respective applications, services and/or resources.

In operation, a user associated with a user device 120 (e.g., mobile phone, desktop computer, laptop, tablet, etc.) may connect to an online service that provides access to, among others, the platform 110 via a web browser displayed on a display unit 123 of the user device 120, for example. Upon accessing the online concierge service, the user may be prompted (e.g., via a prompt message displayed by the web browser on the display unit 123 of the user device 120) to enter log-in credentials (e.g., for accessing subscribed and/or ad hoc features and functions of the platform 110. In some embodiments, the user's log-in credentials may be automatically pre-populated (e.g., from the user device's memory 121) in a designated log-in area (within the web browser) in response to the log-in prompt.

Alternatively, the user may connect to the platform 110 via a software application 121a that resides directly on the user device 120 or that may be accessed through a cloud service provider, for example. Once the software application 121a is launched (e.g., in response to user input), the software application 121a may prompt the user (e.g., via a prompt message generated by the software application 121a and displayed on the display unit 123 of the user device 120) for log-in credentials. In some embodiments, the log-in credentials may be pre-populated (e.g., from the user device's memory 121) in a designated log-in area (within the display unit 123 and generated by the software application 121a) in response to the log-in prompt.

Once the user's log-in credentials have been entered into the designated log-in area and submitted (e.g., responsive to user input to via the input unit 124), the user's log-in credentials may be transmitted, via communications interface 125 over a communications network 140, to the platform 110 for processing by the SSO engine 117a. In some embodiments, the user's log-in credentials may comprise one or more of a username and password, biometric data, voice data, and/or any other authentication information.

Upon receiving the log-in credentials, the SSO engine 117a may perform authentication and authorization functions, such as evaluating the received log-in credentials based on log-in credentials stored in a database 114, obtaining authorization level data associated with the received log-in credentials (e.g., from the database 114), and returning an authentication and authorization response. If the log-in credentials are authenticated, access to the platform 110 may be granted in accordance with the user's authorization level. Alternatively, if the log-in credentials are not authenticated, the SSO engine 117 may return (e.g., via the communications network 140) an access-denial response and/or a prompt to re-enter the log-in credentials. In some embodiments, access to the platform 110 may be on a subscription basis, meaning that a user's access level (e.g., the amount and/or type of features the user may access) may depend on the type of subscription purchased by the user. In some embodiments, various features and functions available through the platform 110 (e.g., internal and/or external applications and/or services) may be purchased on an ad-hoc basis (e.g., in-app purchases), instead of or in addition to the user's subscription level purchase.

Once the user is authenticated and has successfully logged-in to the platform 110, the user may be granted access to various applications 115, services 117 and/or resources 119 to which the user is subscribed and/or otherwise authorized to access. In some embodiments, the user may be presented with an interactive GUI that includes selectable icons, data input areas, and/or one or more display areas for displaying graphics, statistics, video clips, etc.

Modes.

Figure 2:
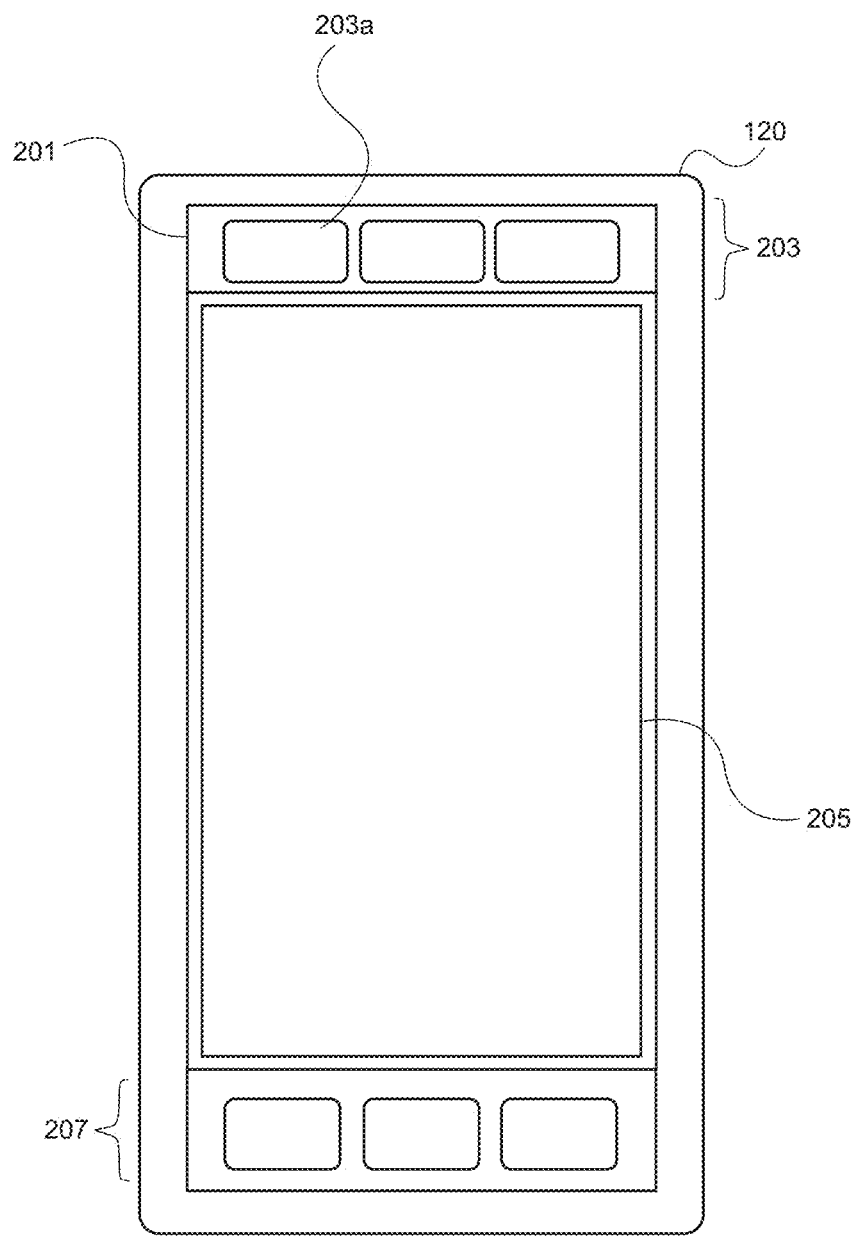
FIG. 2 is an exemplary interactive graphical user interface (GUI) displayed on a user device according to an embodiment of the present disclosure.

Referring now made to FIG. 2, an exemplary interactive GUI 201 displayed on a user device 120 is shown. In this example, the interactive GUI 201 includes a navigation bar 203, a display area 205 and an action bar 207. In some embodiments, the exemplary interactive GUI 201 may include an alternative layout, an alternative combination of navigation and/or action bar selections, and multiple or no display areas. In some embodiments, the interactive GUI 201 may also include a search field configured to receive user input. In this example, navigation bar 203 may include a MODE icon 203a, among other selectable icons. Selection of the MODE icon 203a may enable the user to select one of any number of various modes of play (also referred to herein as simply a "mode") that the user desires to initiate. Each mode available through the platform 110 provides a combination of features and functions for developing shot metrics and statistics, editing and cataloging video clips, leveraging advanced modeling, and other features and functions to provide personalized improvement suggestions and/or strategic shot recommendations. Examples of available modes may include Swing Away Mode, Club Training Mode, Target Practice Mode, Putting Mode, General Training Mode, and/or others.

Upon selection of the MODE icon 203a, the platform 110 may update the interactive GUI display 205 to include one or more available mode options. The mode options may be displayed as a dropdown list, within a pop-up window, a tool bar, and/or in any other suitable manner. In some embodiments, the interactive GUI 201 may simultaneously display multiple options for selecting one or more modes. In some embodiments, the interactive GUI 201 may include a search feature through which a user may search for and select a mode to initiate, as discussed above.

Selecting a desired mode may trigger the platform 110 to generate a new or update the existing interactive GUI display 205 to include one or more additional data input requests. Examples of additional data input requests may include, without limit, "shot clock," "next shot delay," club type(s), number of shots (e.g., in an uninterrupted shot string and/or with a particular club), time limit of mode, and other data and information that may be utilized to enhance the selected mode option. In some embodiments, one or more of the additional data input requested may be obtained automatically by the platform 110. For example, the platform 110 may obtain data from previous user sessions maintained in platform storage 112, from pre-selected parameter settings maintained in user device storage 121, data that is automatically pulled from any of the one or more third-party computing system/data sources 130 (e.g., geo location data, golf course layout data, weather conditions data, etc.), etc.

For purposes of this disclosure, "shot clock" represents a parameter that establishes an amount of time a user (e.g., a golfer) utilizes to take his/her next golf shot. This amount of time may commence at a time designated by the user or the platform 110, at the conclusion of a prior golf shot, or at the expiration of the "next shot delay" parameter (discussed below), and it may conclude at some point shortly after the user swings and strikes the golf ball. The value of the "shot clock" parameter may be set by the user and/or set by the platform 110, and it may be adjusted by the user and/or the platform 110. For example, as the platform 110 receives more and more data about the length of time it takes a user to execute the user's pre-swing routine (e.g., approach, warm-up swings, etc.), the platform 110 (e.g., through the execution of one or more AI models) may determine and suggest a dynamic "shot clock," which evolves over time. Similarly, if the user desires to string together a certain number of swings in a row (e.g., without taking warm-up swings, etc.), the user may adjust the "shot clock" parameter accordingly. Once this "shot clock" parameter is initiated within a mode, the platform 110 may be configured to generate a count-down display on the interactive GUI display 205 to alert the user as to how much time the user has left to swing and strike the golf ball. For example, if the "shot clock" parameter is 30 seconds, the interactive GUI display 205 may show a 30s timer counting backwards from 30 to 0.

The "next shot delay" parameter establishes an amount of time between shots during which a user may rest, travel to the location of the user's shot, take a drink of water, etc. This amount of time may commence at the conclusion of a "shot clock" parameter, and it may conclude at the commencement of the next "shot clock" parameter. The value of the "shot clock" parameter may be set by the user and/or set by the platform 110, and it may be adjusted by the user and/or the platform 110. As with the "shot clock" parameter, as the platform 110 receives more and more data about the length of time the user takes between a conclusion of one swing and commencement of an approach to a subsequent golf swing, the platform 110 (e.g., through the execution of one or more AI models) may determine and suggest a dynamic "next shot delay," which evolves over time. Similarly, if the user desires to string together a certain number of swings in a row (e.g., without taking warm-up swings, etc.), the user may adjust the "next shot delay" parameter accordingly. Once this "next shot delay" parameter is initiated within a mode, the platform 110 may be configured to generate a count-down display on the interactive GUI display 205 to alert the user as to how much time the user has left before the "shot clock" parameter will begin. For example, if the "next shot delay" parameter is 10 seconds, the interactive GUI display 205 may show a 10s timer counting backwards from 10 to 0.

Collectively, the "shot clock" and "next shot delay" parameters may constitute a user's cadence or tempo and, as further discussed below, contribute to the improved efficiently provided by the platform 110. For example, by understanding when a user is engaged in swing activities (e.g., during "shot clock") and when the user is clearly not engaging in swing activities (e.g., during "next shot delay"), the platform 110 is able to strategically initiate and pause image/video capturing and recording functions, thereby preserving system capacity. Said another way, since these cadence parameters may serve to 'force' a user to take each golf shot within predictable time slots, the platform 110 may reduce the amount of resources it uses capturing and recording images and videos during which the user is not engaging in a swing activity. Further still, the cadence parameters represent a queueing structure that avoids the user having to set up (e.g., initiate and/or pause) image/video capturing and recording functions between shots. Instead, the user may play freely without having to engage with the platform 110.

Swing Away Mode. In an embodiment, the platform 110 may be configured to provide, and a user may select, a swing away mode. This mode may be configured to enable a user to take a preselected number of practice swings and/or take practice swings for a predetermine amount of time, in an effort to stretch, warm-up, try new swing approaches, casually practice, etc. As such, the platform 110 may be configured to refrain from recording or tracking these practice swings, so as to not count the swings towards the user's overall swing history. Instead, the platform 110 may simply create a record indicating that this mode was selected, the parameters used in connection with this mode, and other information such as the date, time, location, weather conditions, etc. Inputs useful for this mode may include, for example, cadence parameters (e.g., "shot clock" and "next shot delay"), club selection, geolocation information, weather conditions, etc.

In some embodiments, the platform 110 may be configured to store and maintain user-specific club information associated with a user. For example, the user may input the specific makes, models, and types (e.g., woods, irons, putters, etc.) of clubs that the user uses as part of a 'my bag' collection of data. The user may then select from 'my bag' the particular club(s) the user wishes to utilize during any of the modes described herein. Input parameters for this mode may include, for example, cadence parameters (e.g., "shot clock" and "next shot delay"), club selection(s), number of shots to take per club selection, club/shot type combinations, etc.

Club Training Mode. In an embodiment, the platform 110 may be configured to provide, and a user may select, a club training mode. This mode may be configured to assist a user improve performance with a club or group of clubs. To that end, the platform 110 may be configured to capture images and/or videos of the user's shots, edit and catalog video clips with shot-specific analytics, develop comprehensive shot metrics, accumulate statistics, and leverage advanced modeling to provide personalized improvement suggestions. In addition, the platform 110 be configured to guide the user through a pre-selected combination of clubs and shot types while in this mode. For example, the platform 110 may suggest to the user to take ten strokes each with a driver, a three wood, a five wood, a seven iron and a pitching wedge, and alert the user as to when to transition between clubs and shot types automatically, without the user having to interact with the platform 110 to change clubs, for example. Alternatively, the user may provide as input the club and/or shot combinations he/she wishes to utilize during a session within this mode. Further still, the club/shot type combination may comprise a combination of platform 110 suggestions and user input/adjustments. Inputs for this mode may include, for example, cadence parameters (e.g., "shot clock" and "next shot delay"), club selection(s), number of shots to take per club selection, club/shot type combinations, etc.

Target Practice. In an embodiment, the platform 110 may be configured to provide, and a user may select, a target practice mode. This mode may be configured to assist a user improve shot consistency and accuracy (e.g., by club per distance). To that end, the platform 110 may be configured to capture images and/or videos of the user's shots, edit and catalog video clips with shot-specific analytics, develop comprehensive shot metrics, accumulate statistics, and leverage advanced modeling to provide personalized improvement suggestions. In addition, the platform 110 may be configured to guide the user through a pre-selected combination of clubs and shot distance targets while in this mode. For example, the platform 110 may suggest to the user to take ten strokes with a driver to attempt to hit a target 150 yards away, ten strokes with a three wood to attempt to hit a target 100 yards away, 10 strokes with a seven iron to attempt to hit a target 50 yards away, and so on.

The platform 110 may further be configured to alert the user as to when to transition between clubs and/or targets automatically, without the user having to interact with the platform 110 to change clubs or targets, for example. Alternatively, the user may provide as input the club and/or target combinations he/she wishes to utilize during a session within this mode. Further still, the club/target combination may comprise a combination of platform 110 suggestions and user input/adjustments. Inputs for this mode may include, for example, cadence parameters (e.g., "shot clock" and "next shot delay"), club selection(s), number of shots to take per club selection, target distances per club, club/target combinations, etc.

Putting Mode. In an embodiment, the platform 110 may be configured to provide, and a user may select, a putting mode. This mode may be configured to assist a user improve his/her putting performance. To that end, the platform 110 may be configured to capture images and/or videos of the user's shots (i.e., putts), edit and catalog video clips with shot-specific analytics, develop comprehensive shot metrics, accumulate statistics, and leverage advanced modeling to provide personalized improvement suggestions. In addition, as in the other modes discussed herein, the platform 110 may be configured to guide the user through a pre-selected combination of putter strokes, the user may self-select a combination of putter strokes to take, or a combination of both.

In some embodiments, such as in connection with an actual game play mode or a simulator mode (discussed below), the platform 110 may be configured to provide real-time suggestions and/or guidance to the user. For example, the platform 110 may be configured to determine distance-to-the-pin metrics while the user is on the green, and display this information to the user in real-time. To do this, the platform may leverage the user device's camera functions and/or geo location data to capture information about the user's environment (e.g., ball location, pin location, topography information of the green, etc.), and then leverage the platform's 110 modeling functions to derive distance-to-the-pin metrics. The distance-to-the-pin metrics can provide the user with more precise information on how to approach the putt while the user is preparing to take the putt. In some embodiments, the distance-to-the-pin metrics may be paired with other data and metrics, such as weather conditions (e.g., moisture in the air, dew on the grass, wind, etc.), slope to pin, and other information that may be captured, determined and/or modeled (e.g., via the platform's 110 back-end) to further aid the user make his/her next putt.

Inputs for this mode may include, for example, cadence parameters (e.g., "shot clock" and "next shot delay"), putter selection(s), number of putts to take, distances to pin from which to putt, slope/distance combinations, course layout (e.g., for actual or simulated game play), etc.

Play A Course Mode. In an embodiment, the platform 110 may be configured to provide, and a user may select, a play a course mode. This mode may be configured to assist a user improve his/her performance (e.g., golf score) on a particular course. To that end, the platform 110 may be configured to leverage comprehensive shot metrics, accumulated statistics, and advanced modeling to provide personalized club and shot suggestions to the user as the user navigates an actual golf course. As discussed above, the platform 110 may be configured to generate distance-to-the-pin metrics from any point on the golf course. The distance-to-the-pin metrics, together with topography information, weather conditions (e.g., moisture in the air, dew on the grass, wind, etc.), course layout and other information may be captured, determined and/or modeled (e.g., via the platform's 110 back-end) to further aid the user with his/her next shot. The platform 110 may then leverage this information, together the user's comprehensive shot metrics, accumulated statistics, and advanced modeling to provide personalized club and shot suggestions to the user as the user navigates the simulated golf course.

Figure 8:
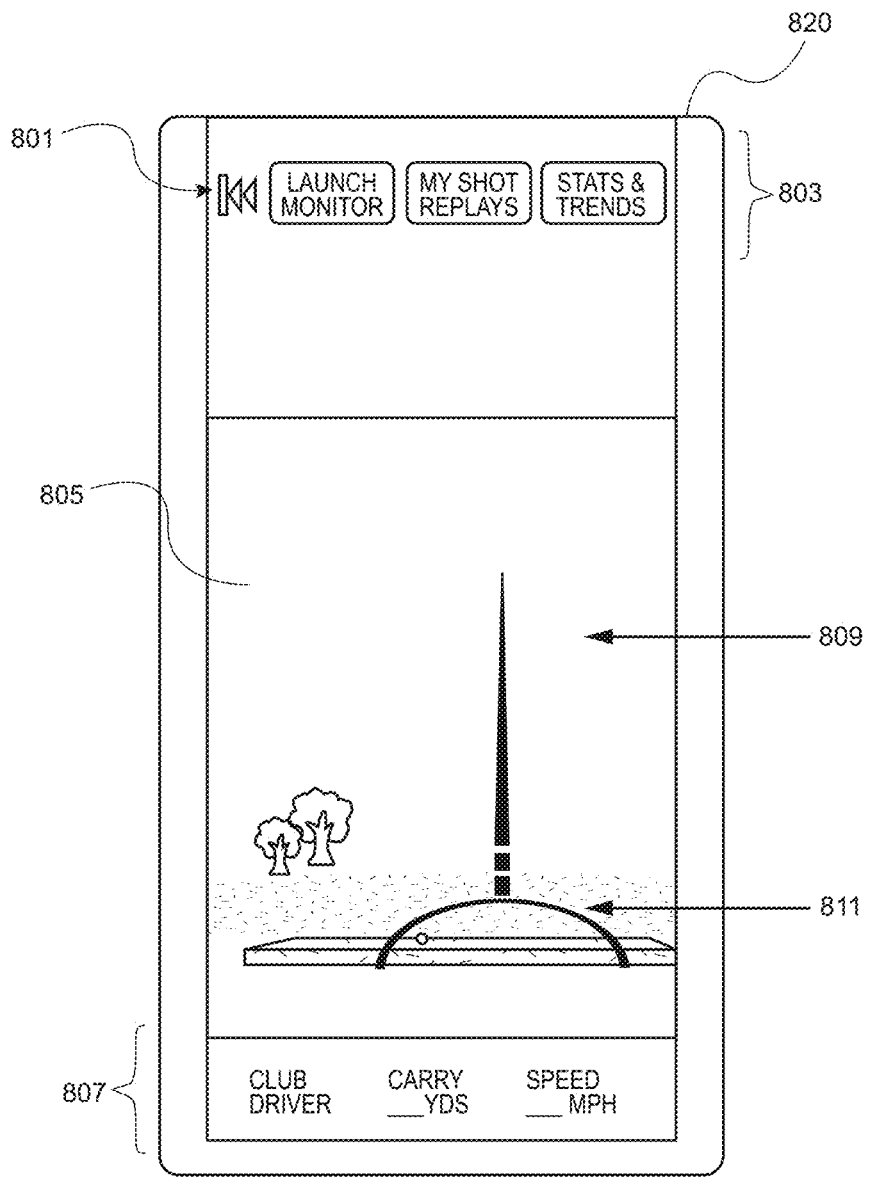
FIG. 8 is an exemplary user device displaying, via an interactive GUI, a flight path target line and a ball location alignment marker superimposed onto a live image according to an embodiment of the present disclosure.

In some embodiments, the platform 110 may generate additional information in the form of target lines and alignment markers to further assist the user in taking a next shot. To illustrate, reference is made to FIG. 8. FIG. 8 shows an exemplary user device 820 having an interactive GUI 801 that includes a display section 805, a navigation bar 803 having one or more navigation icons, and an action/results bar 807. In addition, the interactive GUI display 805 includes a flight path target line 809 and ball location alignment marker 811 superimposed onto a live image of the user's environment. In this example, the flight path target line 809 and the ball location alignment marker 811 may be generated by the platform 110 by leveraging the user device's camera function and/or geo location data to capture images and information about the user's environment (including ball location, pin location, etc.). The platform 110 may then leverage modeling functions to calculate distances, launch angles and other parameters, which may then be converted into the flight path target line 809, the ball location alignment marker 811 and other metrics for display on the interactive GUI display 805.

As in other modes, the user's shots and shot results may be recorded and processed (e.g., edited, enhanced, modeled, analyzed, etc.) by the platform 110 for use in generating performance metrics, future suggestions, predictions, training sessions, video clips, etc.

Inputs for this mode may include, for example, cadence parameters (e.g., "shot clock" and "next shot delay"), club selection(s), topography information, weather conditions (e.g., moisture in the air, dew on the grass, wind, etc.), course layout (e.g., for actual golf course), etc.

Simulation Mode. In an embodiment, the platform 110 may be configured to provide, and a user may select, a simulation mode. This mode may be configured to simulate play on a golf course, while also assisting a user improve his/her performance (e.g., golf score) on the simulated golf course by suggesting club/shot combinations. In this mode, the user may take actual golf shots on a driving range, on an actual golf course, or in any other location. The platform 110 may then capture images and/or videos of the user's actual golf shots, develop shot-specific analytics and metrics, and simulate the result of each actual golf shot onto a simulated or virtual golf course map that may be displayed via the interactive GUI display 205. In some embodiments, the result of each simulated golf shot may be displayed as a trace line or other indicator overlayed on the course map of the simulated golf course. In addition, the platform 110 may be configured to determine simulated distance-to-the-pin metrics from any point on the simulated golf course. The platform 110 may then leverage the user's comprehensive shot metrics, accumulated statistics, and advanced modeling to provide personalized club and shot suggestions to the user as the user navigates the simulated golf course. As in other modes, each actual golf shot the user takes may be recorded and processed (e.g., edited, enhanced, modeled, analyzed, etc.) by the platform 110 for use in generating future suggestions, predictions, training sessions, etc. Inputs for this mode may include, for example, cadence parameters (e.g., "shot clock" and "next shot delay"), club selection(s), course layout (e.g., for simulated golf course), geo location data, etc.

General Training Mode. Regardless of the type of mode selected, the platform 110 may capture images and/or videos of each of the user's shots, edit and catalog video clips with shot-specific analytics, develop comprehensive shot metrics, accumulate statistics, and leverage advanced modeling to generate personalized improvement suggestions. These personalized improvement suggestions may be provided in the form of tailored training videos, images, descriptions, etc., directed to improve various aspects of a user's game. For example, video clips of a user's driver shots may be analyzed to identify inconsistences and/or deficiencies with the user's driver swing. With this information, the platform 110 may leverage its AI modeling technics to develop a training regimen aimed at modifying aspects of the user's biomechanics that may be impacting the user's driver swing. This training regimen may then be added as another mode that is available for selection by the user.

In some embodiments, the platform 110 may guide the user through a platform-guided routine aimed at teaching a user how to practice. The platform-guided routine may guide the user through various combinations of clubs and shots, as well as other activities (stretching), that may help the user improve his/her performance.

Clubadex.

Images or videos of golf shots taken or captured during any of the modes described above may be labeled, organized, packeted, communicated, etc. for any number of purposes (referred to herein as the platform's 110 "clubadex" feature). For example, users may utilize the platform 110 to label/tag certain video clips shots (or other observations) they like in their "favorites" inventory, and ultimately select a "model shot" per golf club, for example. This "model shot" spectrum, which may be organized by club via the platform 110, may effectively provide each user with a view of his/her "optimal shot per club" and other related insights. In some embodiments, the model shot spectrum may be organized according to additional or alternative parameters and/or sub-categories, such as by golf course, weather conditions, time of day, etc. A collection of model or ideal shots per club, per golf course, per weather condition and/or any other category may comprise each user's "Model Shot Clubadex," for example. Conceivably, a user may also want to create another clubadex to organize other categories of shots.

For example, shots taken during a training regimen may be organized into a clubadex, for example, for further analysis and/or to share with an instructor or other user. The instructor or other user may, in turn, leverage the platform 110 to review results from the training regimen, analyze trends over time, and adjust the training regimen accordingly. As will be appreciated, this succinct set of packaged deliverables (e.g., indexed video clips of shots grouped together by club, course, weather condition, training session, or any other category) provided by the platform 110 provides an efficient form of communication—where the data is meaningful to all users—while centrally stored and managed for case of access.

In some embodiments, the platform 110 itself may operate as a virtual trainer, by analyzing the user's clubadex of golf shots, developing a suggested training regimen based on the analysis, and repeatedly updating the suggested training regimen according to user's observed performance over time. To do this, a corpus of labeled golf shot video clips (e.g., labeled as "model shots," "poor shots," and/or a combination thereof) may be added into an existing training data set to create an updated training data set. The updated training data set may then be used by the AI engine 115b to update one or more existing AI models. The updated AI models may then be executed or re-executed, as needed, to generate updated predictions, training sessions, suggestions, etc. that are more tailored to the user. Notably, this same approach may be initiated to update (e.g., re-train) any of the AI models described herein.

User Device Positioning.

Figure 3:
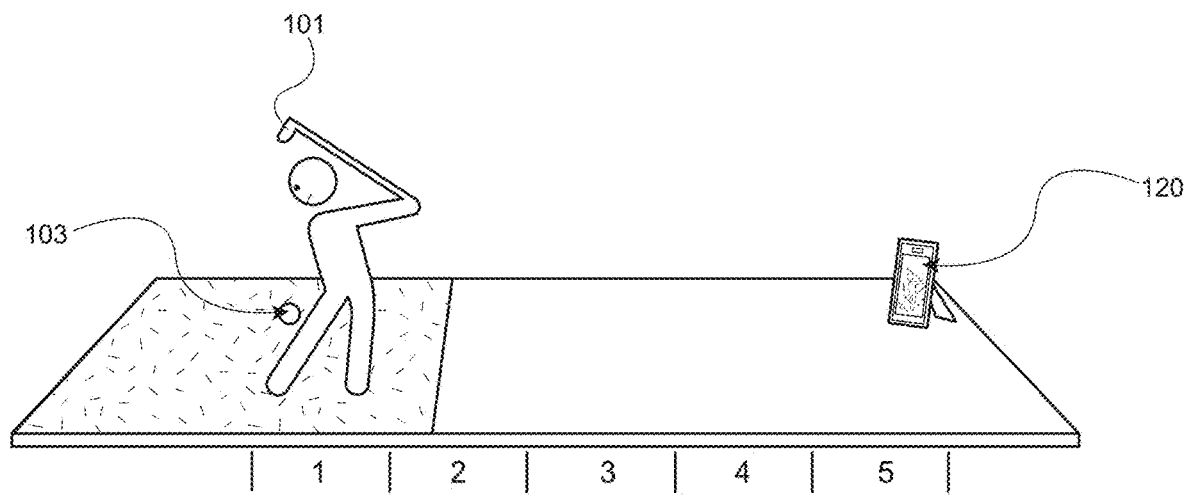
FIG. 3 is an exemplary placement of a user device relative to the user according to an embodiment of the present disclosure.

In an exemplary embodiment, the user may position his/her user device 120 a predetermined number of paces or feet (e.g., five (5) paces (15 feet)) behind a golf ball 103 relative to the direction in which the user 101 intends to send (strike) the ball 103, with the user device's camera facing the direction in which the user intends to send the ball. FIG. 3 illustrates an exemplary placement of the user device 120 (e.g., the user's mobile phone device) relative to the user 101. In some embodiments, the user 101 may select and initiate the mode of play (discussed above) prior to positioning the user device 120, and in some embodiments, the user 101 may first position the user device 120 and then initiate the mode of play once positioned.

Image/Video Capture and Edit.

As discussed above, once a user selects and initiates mode of play, the platform 110 may be configured to capture images and/or videos of the user's golf shots, edit and catalog video clips (of the golf shots), develop shot-specific analytics, develop comprehensive shot metrics, accumulate statistics, leverage advanced modeling (e.g., to provide personalized suggestions), etc., all of which may support and/or enhance the selected mode of play. This may include, for example, guiding the user through a pre-selected combination of clubs and/or shot types (e.g., as part of a training-type mode of play), providing personalized in-game club and shot suggestions, distance-to-pin metrics, course topography information and other real-time information (e.g., during a virtual or actual game play mode), and providing edited video clips with trace lines (e.g., illustrating the flight of a ball upon being struck) and other shot analytics and metrics (e.g., during any mode of play).

To accomplish the foregoing, the platform 110 may be configured to auto-record a user's golf shots and deliver videos of the golf shots to the platform's 110 back-end for processing (e.g., editing, modeling, enhancing, etc.), while the user advances to his/her next shot, for example. In some embodiments, the platform's 110 back-end may be a combination of cloud-based services and applications. At the platform's 110 back-end, AI/ML models and techniques may be leveraged to process the recorded videos, locate the golf ball, track the path of the ball strike, calculate swing speed and/or flight speed of the ball (e.g., miles per hour), determine distance projections (e.g., distance-to-the-pin), etc.

The platform's 110 back-end may further be configured to edit each received video to a shortened version, enhance the quality of the video by add a trace line or other informative data/information (discussed further below), for example, overlaid onto a summary composite image of the shot result, store shortened videos and other datasets by club, type of shot (e.g., tee shot, putt, etc.), or any other category, and deliver replay sharing and further analysis of that shot back to the user.

In some aspects, the front-end of the platform 110 described herein may be configured to (1) initiate a video recording routine, (2) establish and/or initiate a transition sequence from record-to-pause, (3) send transmission delivery of full video to the platform's 110 back-end service for processing/editing, and (4) receive transmission delivery of an edited version of the video (herein referred to as a "video clip") from the back-end. The back-end of the platform 110, as noted above, may receive the full video recording from front-end, process the resulting images captured in the video and apply AI/ML techniques to distill intelligence from observational data across sequential frames of the video. The full video may be processed and/or edited by the back-end of the platform 110 in a number of ways, as discussed herein, to produce an enhanced video clip by shortening, annotating, and applying image enhancement and other techniques to the full video.

Since a video is comprised of video frames that comprise a string of images captured at a certain rate of frames per second (FPS), the video frames may appear sequentially at predictable points in time. As a result, the platform 110 may utilize digital image processing that includes object identification, object location, motion detection-connecting these "point-in-time" object representations over a sequential time axis- and account for spatial changes across sequentially aligned frames through the representation of the located object's perceived relative size differentials. As further discussed below, videos that are recorded and processed (e.g., as part of a particular mode of play) may then be packaged and indexed accordingly, and delivered to the front-end of the platform 110 as a package of video clips.

In some embodiments, one or more back-end functions described above may be executed by the front-end of the platform 110, and in other embodiments, one or more of the front-end functions described above may be performed by the back-end of the platform 110.

Figure 4:
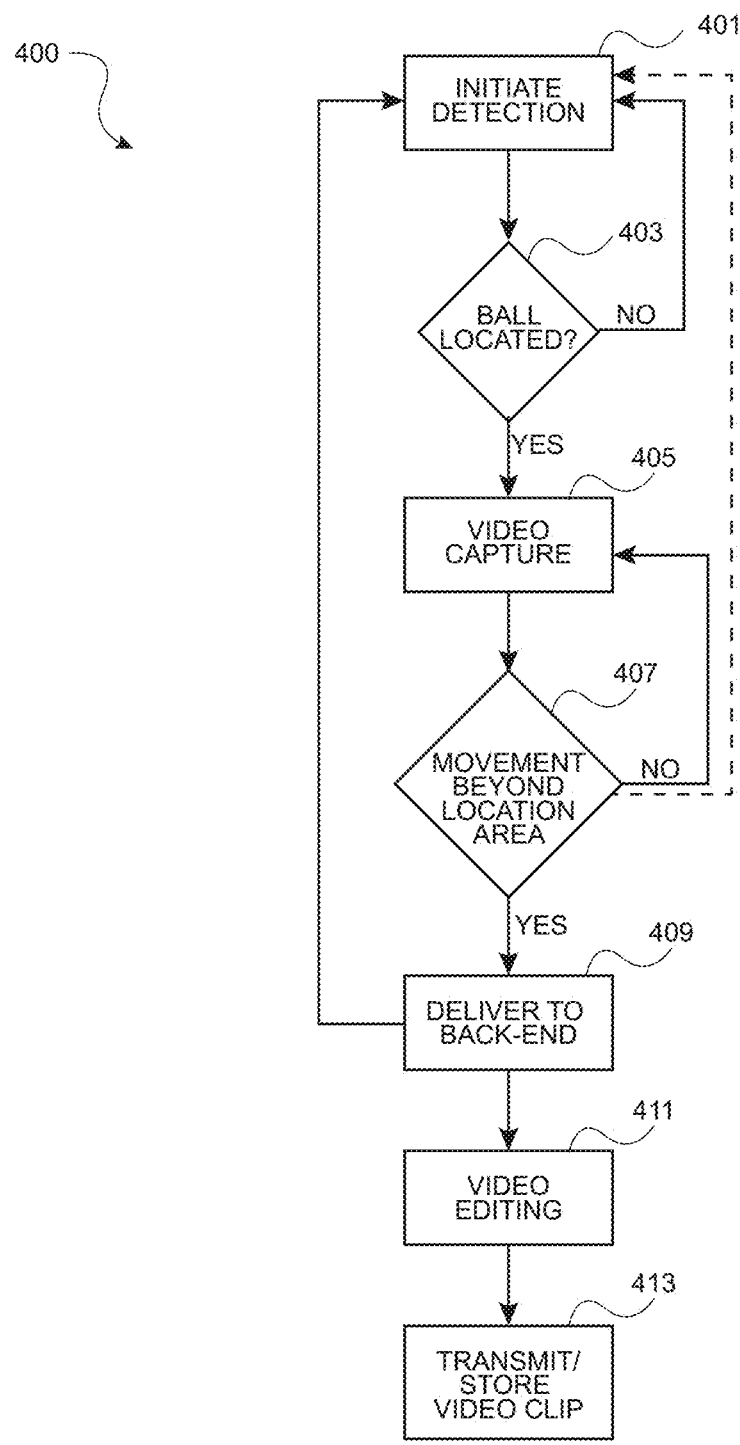
FIG. 4 is an exemplary flow diagram of an exemplary process for generating video clips in according to an embodiment of the present disclosure.

Turning now to FIG. 4, a flow diagram illustrating an exemplary process 400 for generating video clips in accordance with the present disclosure is shown. The exemplary process 400, in this example, may commence once a user device 120 is in position (see e.g., FIG. 3) and a mode of play has been selected and initiated.

As discussed above, initiating a mode of play may include selecting, confirming and/or adjusting a user's tempo or cadence parameters, namely, the user's "shot clock" and "next shot delay" parameters. The "shot clock" parameter may represent an amount of time during which a user may prepare to take his/her next golf shot (e.g., approach, warm-up swings, etc.), and the "next shot delay" parameter may represent an amount of time between shots during which a user may rest, travel to a location of the user's next shot, etc. During these two periods, the platform 110 may be configured to generate a count-down display on the interactive GUI display 205, which may include a timer that counts down until that particular period ends. As noted above, this count-down period enables the platform 110 to strategically initiate and pause image/video capturing and recording functions until the user is close to initiating a next shot, thereby preserving system resources and capacity. With this context in mind, reference is again made to the exemplary process 400 of FIG. 4.

At step 401, the platform 110 may be configured to initiate an object location sequence to locate a position of a golf ball. In some embodiments, the object location sequence 401 may be initiated during a portion of the "shot clock" countdown (e.g., while the user is warming up and getting ready to make his/her approach before swinging), and it may involve leveraging the user device's 120 image capture features to locate and lock-in on the location of the ball (e.g., within a pre-defined ball location area). This ball location sequence 401 may be repeated for a pre-determined amount of time or for a pre-determined number of attempts until the ball is located.

At step 403, the platform 110 may determine whether the ball has been located. If the ball has not been located within the pre-determined amount of time or within the pre-determined number of attempts, the platform 110 may alert the user and/or automatically re-initiate this step 401. In addition, the platform 110 may reset the "shot clock" countdown so as to maintain the user's cadence in tact. Alternatively, if the ball is located, the process 400 may proceed to step 405.

At step 405, the platform 110 may leverage the user device's 120 video capturing feature (e.g., the user device's 110 camera) to automatically initiate a video recording process that includes recording the ball before, during and after it is struck. The video recording 405 may commence as soon as the ball is located and locked-in (via step 401) or at some pre-determined point in time shortly thereafter, and it may persist for a pre-determined amount of time (e.g., 30 seconds).

Once the video recording step 405 is initiated, the platform 110 may, at step 407, continue to leverage the user device's 120 image lock-in feature to determine whether the ball has moved beyond the pre-defined ball location area. Thus, for example, if the user glances the ball to cause it to move a negligible distance, or if the user fails to strike the ball at all, the platform 110 may determine that the ball has not moved beyond the pre-defined ball location area within the pre-determine amount of recording time (e.g., 30 seconds). If this occurs, the platform 110 may automatically cease recording, send an alert to the user, and/or restart the video recording step 405. In some cases, the platform 110 may suggest to the user and/or automatically initiate a return to the beginning of the video recording process 400 (i.e., a return to step 401). This may occur, for example, after one or more failed attempts at video recording the ball moving beyond the pre-defined ball location area.

If, however, the platform 110 determines at step 407 that the ball has moved beyond the pre-defined ball location area, the video recording 405 step continues to record until the pre-determined amount of recording time is exhausted. Next, at step 409, the full-length video recording (e.g., 30 seconds) may be delivered to the platform's 110 back-end for processing and editing, while front-end aspects of the platform 110 loop back to the beginning of the process 400 and prepares to record the user's next shot in accordance with the user's tempo parameters. That is, the platform 110 will 'pause' or cease recording (step 405) until the user is about to take a next shot. This pause may include the amount of time defined by the "next shot delay" parameter as well as a portion of the "shot clock" parameter, as discussed above.

In parallel, the platform's 110 back-end may, at step 411, initiate one or more processes, routines, etc. discussed herein to edit the captured video recording, create derived analytics and outputs from the video recording, and so on. One of the outputs generated at step 411 may include a video clip and/or a packet of video clips. As discussed above, each video clip may include the results of intelligently locating and grouping together all of the video frames just prior to the ball strike (e.g., 3-seconds prior) and those video frames up to just after the ball strike (e.g., 5-seconds after). To do this, the platform 110 may be configured to identify and mark the frame during which the ball transitions from still to moving (e.g., the 'first transition frame'), group those frames extending for a predetermined amount of time just prior to the first transition frame and those frames extending for a predetermine amount of time following the first transition frame, and discard/delete the remaining video frames. Alternatively, the platform 110 may identify and mark the first transition frame and a second transition frame (i.e., the frame during which the ball transitions from moving to still), and then group the video frames extending for a predetermined amount of time just prior to the first transition frame and those video frames extending for a predetermined period of time following the second transition frame. In this manner, the platform 110 is able to create a shortened video clip (in this example, an 8-second clip) that concisely includes only those pertinent portions of the user's activity (e.g., approach, swing, and follow-through), while further reducing the amount of memory and processing resources required to store and further analyze each video clip.

The platform 110 may simultaneously initiate (e.g., via the AI engine 115b) one or more AI modeling processes and/or mathematical techniques to a video clip to derive (among other things) impact time, impact angle and impact speed between a golf club and golf ball, ball trajectory, ball deceleration, ball location, ball distance traveled, and/or other metrics and information that may be used to identify trends, areas of improvement, and so on. As noted above, each video clip is comprised of video frames comprising a string of images captured at a certain rate of frames per second. As a result, each video frame corresponds to a point-in-time (e.g., akin to a time stamp). In addition, each video frame indicates a size, shape and location (e.g., XY coordinates) of the golf ball. Thus, in order to derive impact time, impact angle and speed, and other metrics, the video frames may be analyzed by the platform 110 to identify the sequence of video frames that define the flight path of the golf ball. This sequence of video frame includes the video frame in which the ball commences its flight path (e.g., the frame in which the location, size and/or shape of the ball changes from that of a prior frame) and the video frame in which the flight path ends (e.g., the frame in which the location, size and/or shape of the ball is unchanged in a subsequent frame).

The sequence of video frames defining the golf ball's flight path may then be analyzed individually to determine the location (XY coordinate), size, shape, point-in-time, and other data (e.g., meta data) relating to the golf ball in each said video frame. This data may then be written to a table and stored in memory. Next, the platform 110 may leverage a combination of AI models to normalize the data obtained from the sequence of video frames. Normalizing the data, as discussed above, may include identifying outliers, corrupted and/or missing data, such as irregularities in the size, shape and/or location of the golf ball from frame to frame, and removing the outlier data, resolving the corrupted data and/or replace the missing data, for example.

Once the video frame data is normalized, the platform 110 may apply mathematical techniques to the normalized data to calculate impact time, impact angle and impact speed between a golf club and golf ball, ball trajectory, ball deceleration, ball location, ball distance traveled, and/or other metrics.

In some embodiments, the platform 110 may leverage its AI modeling processes and/or mathematical techniques to develop a composite shot summary from a video clip. The composite shot summary may be used to visually demonstrate the results of a golf shot by synthesizing all recorded ball flight video frames (e.g., images) into a trace line that overlays on top of the landscape displayed on a user device 120. Additionally, statistical data and information (e.g., club, carry distance, speed of shot, impact angle, impact speed, carry, etc.) associated with the golf shot may also be included in the composite shot summary.

As indicated above, video clips (including the video clip from with the composite shot summary will be derived) are comprised of video frames comprising a string of images captured at a certain rate of frames per second. As a result, each video frame corresponds to a point-in-time (e.g., akin to a time stamp) and indicates a size, shape and location (e.g., XY coordinates) of the golf ball. Generating the composite shot summary may therefore include analyzing, by the platform 110, the video frames to identify the sequence of video frames that define the flight path of the golf ball. This sequence of video frames may then be analyzed individually to determine the location (XY coordinate), size, shape, point-in-time, and other data (e.g., meta data) relating to the golf ball in each said video frame. This data may then be written to a table and stored in memory.

Next, the platform 110 may leverage a combination of AI models to normalize the data obtained from the sequence of video frames. As noted above, normalizing the data may include identifying outliers, corrupted and/or missing data, and removing the outlier data, resolving the corrupted data and/or replace the missing data.

Once the video frame data is normalized, the platform 110 may apply mathematical techniques to the normalized data to calculate the metrics included in the composite shot summary. In addition, the normalized data may then be plotted on every frame in the sequence of video frames to create a trace line.

Once a video clip is edited and analyzed to create derived analytics, metrics and other outputs (step 411), the platform 110 may (at step 413) transmit the video clip, its corresponding analytics, metrics, etc. to the user device 120 for display and/or storage thereon. Step 413 may also involve indexing and/or packaging one or more video clips into groups of video clips (e.g., by club, by date, by location, etc.), together with their corresponding analytics, metrics, etc., and transmitting the package(s) to the user device 120 for display and/or storage thereon. The video clips, analytics, etc. may also be stored by the platform's back-end (e.g., in cloud storage) for later use and analysis.

Figure 9:
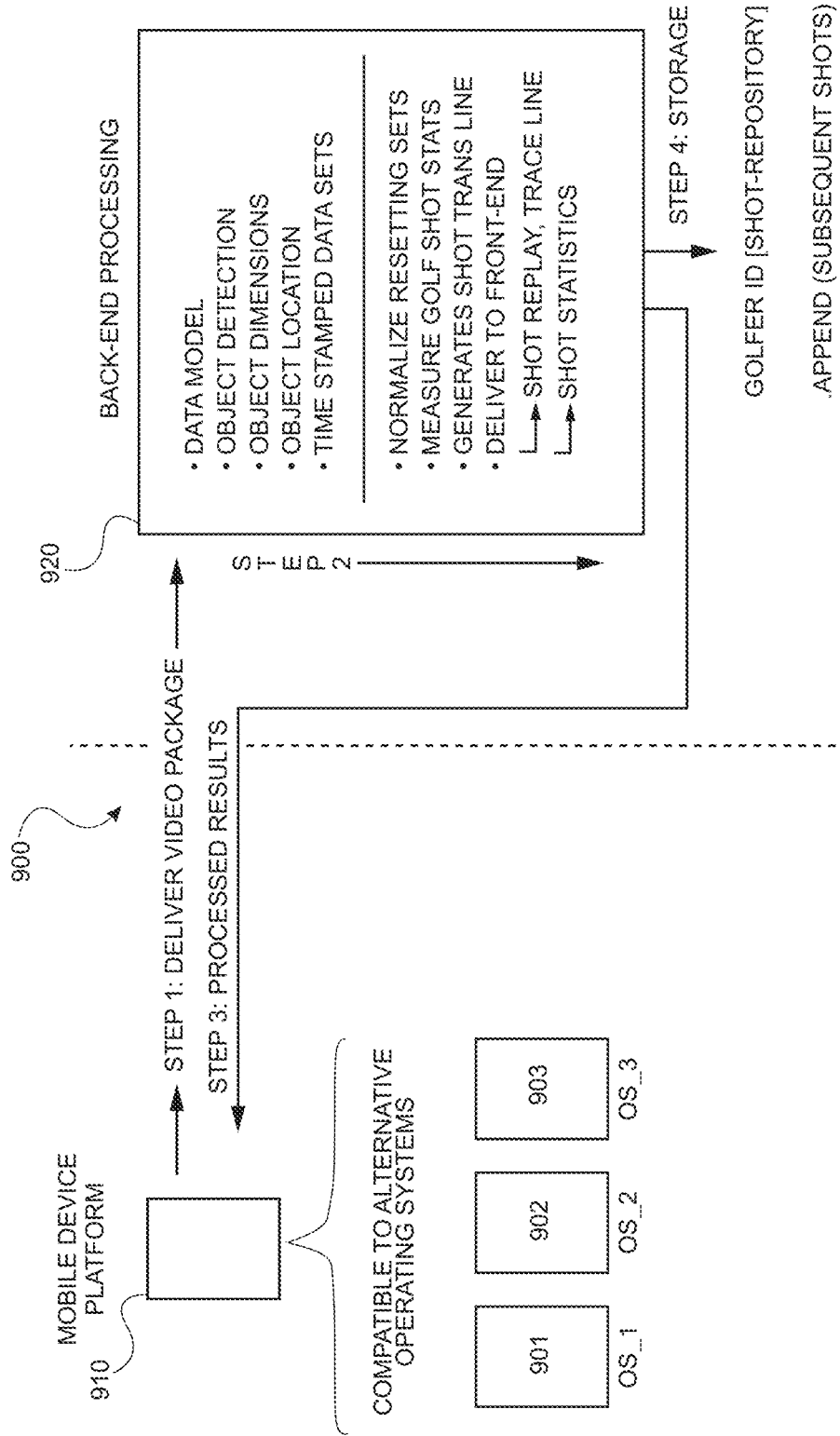
FIG. 9 is an exemplary diagram illustrating interactions between a mobile device platform and back-end processing according to an embodiment of the present disclosure.

Reference is now made to FIG. 9, which illustrates an exemplary diagram 900 depicting interactions between a mobile device platform 910 and back-end processing 920 according to the present disclosure. In this example, mobile devices 901, 902, 903 are each uniquely configured, insofar as each has a different operating system (e.g., OS_1, OS_2 and OS_3, respectively) and different meta-camera specifications (e.g., focal length, frames per second (FPS), pixel resolution, etc.) As a result, the quality and accuracy of content captured by each (e.g., video/image recording) is inherently different and limited by their respective configurations. Thus, the quality and accuracy of objects recorded with mobile device 901 will differ from the quality and accuracy of objects recorded by mobile device 902, and the format in which each records is different. That said, even if the image/video quality and accuracy of one mobile device is superior to that of another, all mobile devices are nonetheless limited (e.g., by their pixel resolution, FPS, etc.) to some extent. The platform 110 herein addresses these (and other) deficiencies by enhancing the content received from each mobile device 901, 902, 903 to compensate for the deficiencies specific to each, and return the enhanced content to each respective mobile device 901, 902, 903 in the format in which the content was received, as discussed below.

Indeed, as shown in FIG. 9, mobile device platform 910 shall be used to represent any of mobile devices 901, 902, 903 (or any other device having a different operating system and/or different meta_camera specifications). Once a mobile device 910 captures a video recording, it may transfer the video recording to the platform 110 for back-end processing 920 (STEP 1). The back-end processing 920 (STEP 2) may include data modeling, which may involve creating and implementing the apparatus that defines and interprets information passing from one process to another. To that end, the data modeling may comprise initiating operations relating to constructing set of directories, folders, file names, attributes, labels, data connection, etc.

Back-end processing 920 (STEP 2) may further include object detection operations which, as discussed above, may comprise leveraging AI modeling to identify, locate and process what is observed within each video frame in a sequence of video frames. Results of the object detection operations may include dimension data (size, shape, etc.), object location (e.g., XY coordinates) and timestamped data sets, which may in turn undergo one or more normalization processes, as discussed above.

One such normalization process may involve further adjusting/translating the object detection data (e.g., dimension data, object location data, timestamped data) to account for each mobile device's 910 deficiencies as defined by their respective meta_camera specifications. That is, known deficiencies in a mobile device's 910 focal length, FPS, pixel resolution, etc. may be used to adjust or correct predictable deficits in captured object detection data. In this manner, the platform 110 (via back-end processing 920) is able to compensate for each mobile device's 910 deficiencies as defined and produce normalized object detection data that is superior (e.g., more accurate/better quality) than the object detection data received.

Moreover, since object detection data received from each mobile device 901, 902, 903 is normalized according to its respective meta_camera specifications, the resulting normalized object detection data generated by the platform 110 will be consistent in terms of quality, accuracy, etc. across all mobile device 901, 902, 903.

Once the object detection data is normalized, back-end processing 920 may apply mathematical techniques to the normalized object detection data to determine and measure golf shot statistics and other metrics, generate a trace line, and deliver a shot replay with the trace line superimposed therein, together with the statistics and metrics, to the mobile device platform 910 (STEP 4). In addition, the shot replay with the trace line and the statistics and metrics may be indexed and stored (e.g., in back-end cloud storage) (STEP 4).

Clubadex.

The "clubadex" feature discussed above refers to a new approach to labeling, organizing, etc. and communicating a series of golf shots (or other observations) for a variety of purposes. For example, users may utilize the platform to label/tag certain shots (or other observations) they like in their "favorites" inventory, and ultimately select a "model shot" per golf club, for example. This "model shot" spectrum, which may be organized by club via the platform, may effectively provide each user with that particular user's view of his/her "optimal shot per club" and other related insights. In some embodiments, the model shot spectrum may be organized according to additional or alternative parameters and/or sub-categories, such as by golf course, weather conditions, time of day, etc. A collection of model or ideal shots per club, per golf course, per weather condition and/or any other category may comprise each user's "Model Shot Clubadex," for example. Conceivably, a user may also want to create another Clubadex based on shots taken during a training regimen, for example, for further analysis and/or to share with an instructor or someone other than the user. The instructor or other third party may, in turn, invoke the platform to easily review results from the training session, analyze trends over time, and adjust their training methods accordingly. In some embodiments, the platform itself may operate as a virtual trainer, by analyzing the user's golf shots, developing a suggested training regimen based on the analysis, and repeatedly updating the suggested training regimen according to user's observed performance over time. This succinct set of packaged deliverables (e.g., indexed shots grouped together by club, course, weather condition, training session, or any other category) provides an efficient form of communication—where the data is meaningful to all users—while centrally stored and managed for case of access.

Figure 5:
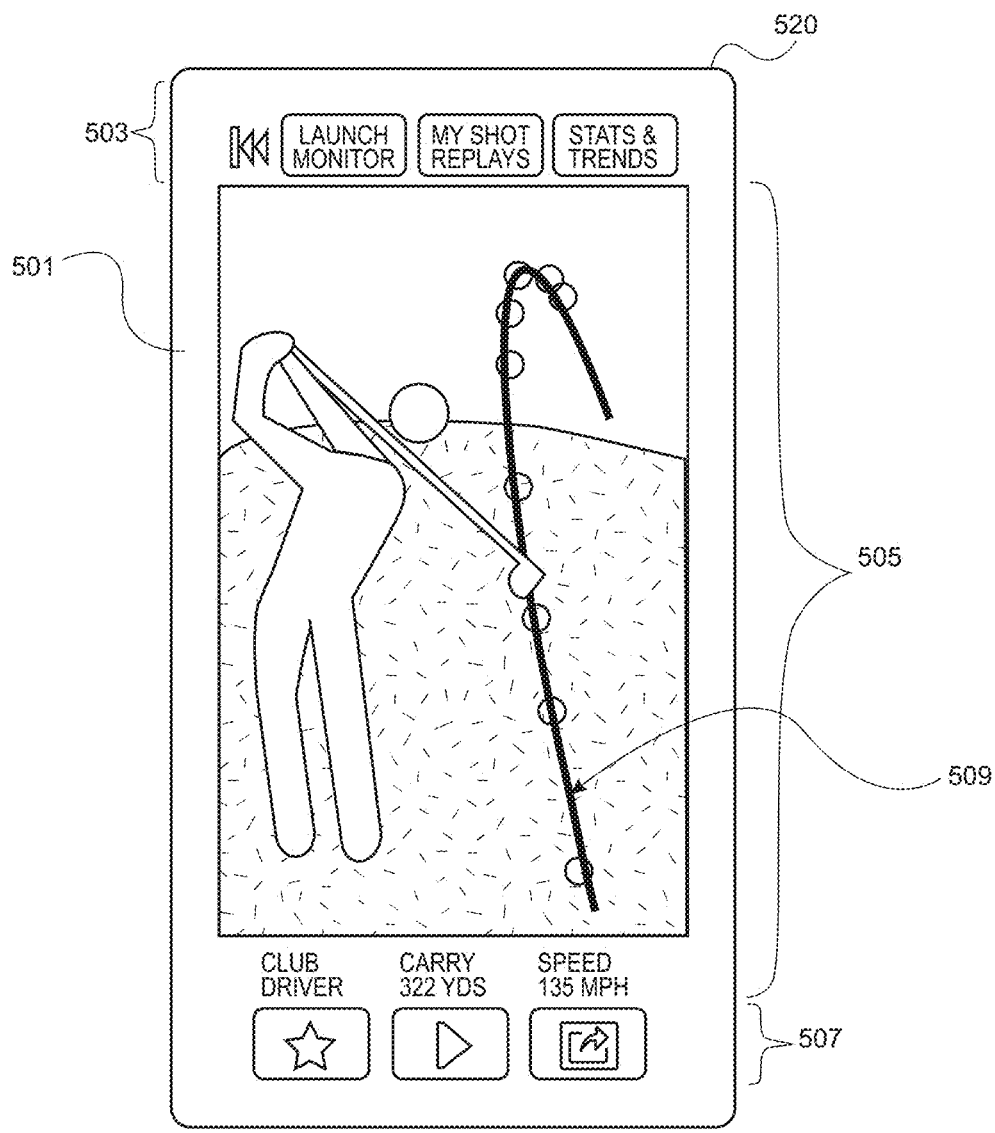
FIG. 5 is an exemplary user device displaying, via an interactive GUI, a composite shot summary according to an embodiment of the present disclosure.

Turning now to FIG. 5, an exemplary user device 520 having an interactive GUI 501 that includes a display section 505, a navigation bar 503 having one or more navigation icons, and an action/results bar 507 is shown. In addition, the interactive GUI display 505 also includes a composite shot summary. In this example, the composite shot summary includes an image of the user's swing, a trace line superimposed onto the image of the user's swing, and results/metrics of the shot (e.g., distance, carry, etc.). As will be appreciated, information such as the composite shot summary may provide an instant assessment of the user's shot, enabling the user or platform to categorize or label the shot as "great", "poor" or anything in between. Each composite shot summary may then be stored and recalled as needed. For example, when filtering through an inventory of the user's shots made with a driver club, the user may be able to review and compare the composite shot summaries of various driver shots to track the user's progress.

Figure 6:
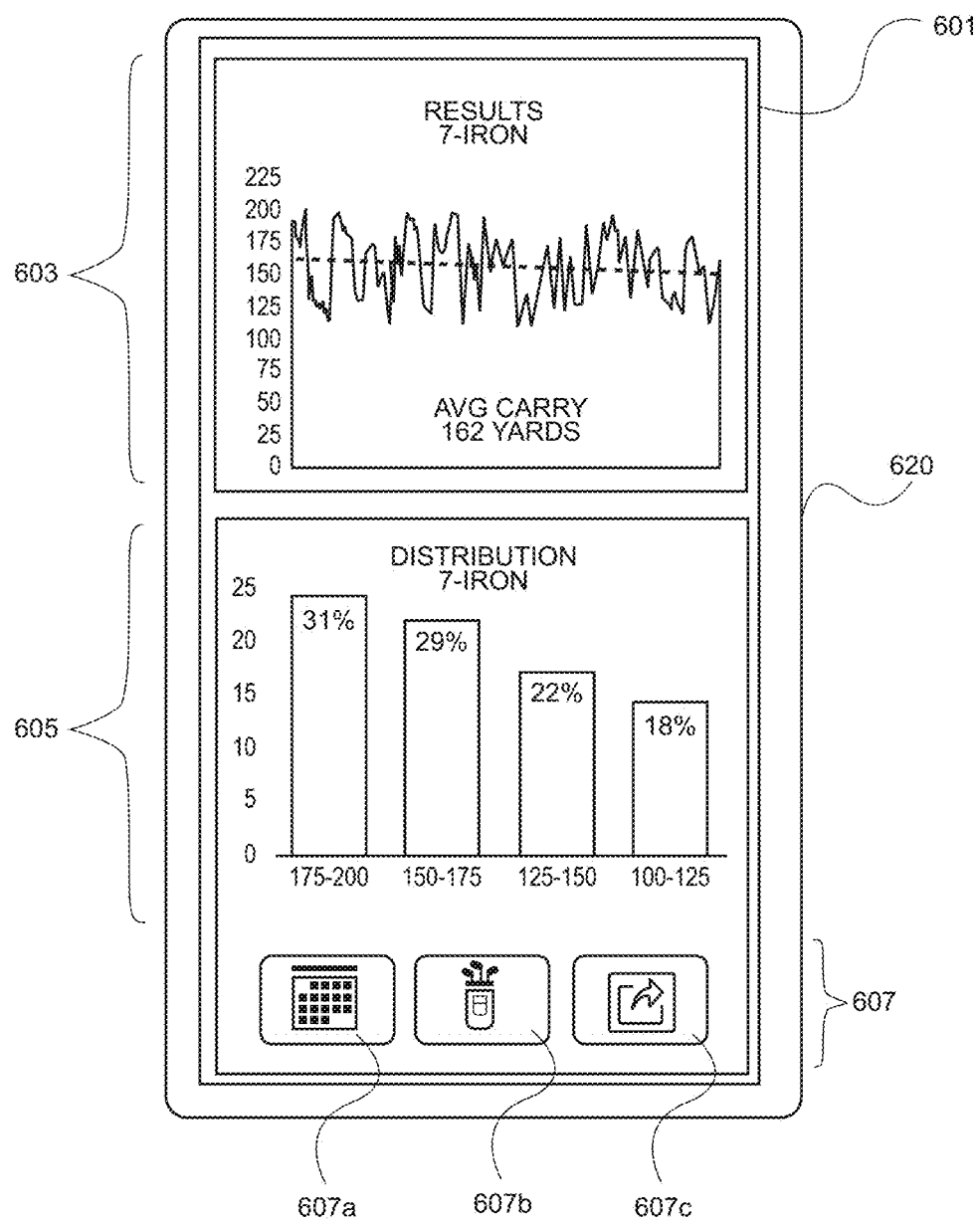
FIG. 6 is an exemplary user device displaying, via an interactive GUI, a statistical analysis of shots by a single club over time according to an embodiment of the present disclosure.

In addition to providing composite shot summaries, trace lines, and some of the other metrics described above, the platform 110 of the present disclosure may also be configured to determine comprehensive shot metrics, statistics, and other information, and organize the same for display via a user's device. Turning now to FIG. 6, an exemplary user device 620 having an interactive GUI 601 is shown. In a first portion of the display 603, a graphical depiction of the average carry by club (e.g., a 7-iron), together with a calculated trend line superimposed thereon, is shown. In a second portion of the display 605, a frequency distribution, grouped by distance (yards), of the user's 7-iron shots is shown. In a third portion of the display 607, selectable icons 607a, 607b for filtering the results shown in the first and second portions (603, 605), are provided. In this example, the results may be filtered by date 607a and/or club 607b, although other embodiments may have alternative combination of filter options. The user may also return 607c to a prior GUI screen to access other features and functions of the platform 110.

Figure 7:
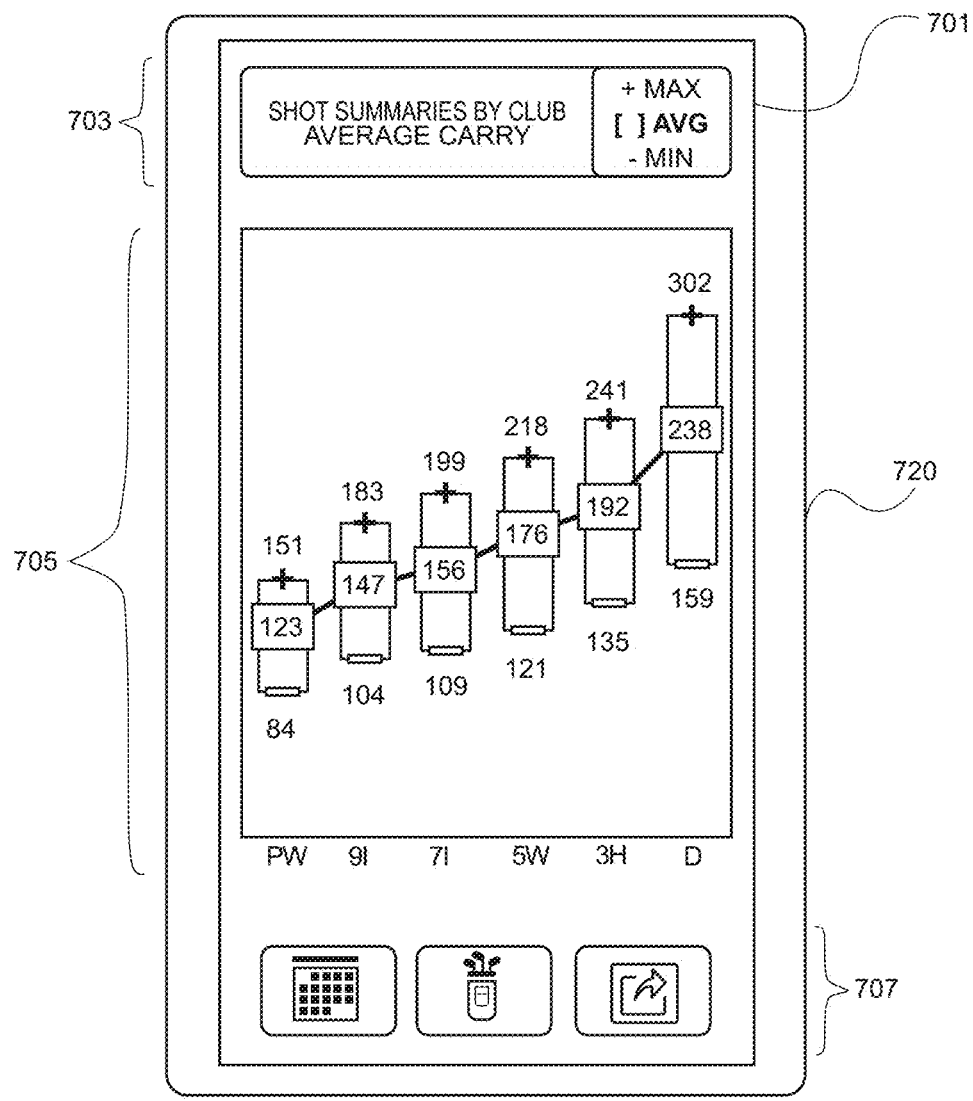
FIG. 7 is an exemplary user device displaying, via an interactive GUI, a statistical analysis associated with multiple clubs over time according to an embodiment of the present disclosure.

Turning now to FIG. 7, an exemplary GUI that depicts another exemplary user device 720 having an interactive GUI 701 is shown. In this example, a cross-sectional view of statistical analysis and other metrics associated with multiple clubs utilized by the user over time is shown. A first portion 703 of the interactive GUI 701 displays a toggle feature that enables a user to select any number of number of metrics to display in a second portion of the interactive GUI 701. As shown, the toggle feature is set to "average carry," which refers to the distance a particular golf shot remains airborne. As noted, the toggle feature may be set to other metrics such as mph (miles per hour), left/right lean, ball spin, biomechanics, etc. In the second portion 705 of the interactive GUI 701, a graphical depiction of the selected metric (e.g., average carry per club) is shown, with minimum and maximum boundaries. In this example, the average carry per club is shown for a putting wedge, a 9 iron, a 5 wood a 3 wood and a driver. A third portion 707 of the interactive GUI 701 may include selectable icons 707a, 707b for filtering the results shown in the second portion 705. In this example, the results may be filtered by date 707a and/or combination of clubs 707b, although other embodiments may have alternative combination of filter options. The user may also return 707c to a prior GUI screen to access other features and functions of the platform 110.

As will be appreciated, the succinct, informative and analytical set of packaged information described herein (see e.g., FIGS. 5-7) represent an efficient form of communication—where the data is meaningful to users—while centrally stored and managed for case of access. As with other statistics and metrics, those depicted in FIGS. 6 and 7 may be determined/derived by the platform by applying AI modeling processes and/or mathematical techniques to images and videos captured using the user's own user device. As will be evident from the foregoing, the platform 110 described herein incorporates intelligent and real-time golf shot analysis, user biomechanics analysis, equipment analysis, condition analysis, user sentiment data (e.g., how a use 'feels' about a particular shot), and so on, all within a single platform 110 to produce robust, comprehensive and informative output. As a generator of analyzed golf shots, labeled by club and performance result, for example, the platform 110 enables communications and distribution networks to further elevate the user experience around the game of golf. That is, the platform 110 is built with the user experience in mind, where they can manage the entire process, all packaged within a mobile, personal user device 120.

By design, the platform 110 is configured for ease-of-use and mobility. To that end, the platform 110 is configured to be accessed and utilized from any user device 120, to collect all types of data, such as observational, geographic, topographical, geological, etc., in real time, to process that data, to transmit the data for back end processing and to return modeling output and other output (based on the collected data) for presentation on the user device 120. As noted above, the platform's AI models may reside in a back-end cloud repository, enabling a separation of duties and lightening the load on the front-end. Similarly, video image processing methodologies may leverage open-source code for systematic cross-platform compatibility. The resulting services and features may therefore support multi-threaded access, leveraging the economics of scale inherent with back-end processing for systematic, heavier routines, and maintaining a lighter front-end load to optimize performance.

Aside from this disclosure, the very concept of platform that may be used to effectively convert a user device into a launch monitor or simulator does not exist. As a result, the features and functions described herein constitute a significant advancement in the art.

Embodiments of the subject matter and the functional operations described in this disclosure can be implemented in digital electronic circuitry, in tangibly embodied computer software or firmware, in computer hardware, including the structures disclosed in this disclosure and their structural equivalents, or in combinations of one or more of them. Embodiments of the subject matter described in this disclosure may be implemented as one or more computer programs, i.e., one or more modules of computer program instructions encoded on a tangible non-transitory storage medium/program carrier for execution by, or to control the operation of, a data processing apparatus (or a computing system). Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, a server or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, special purpose microprocessors or another kind of specifically configured central processing unit. A central processing unit according to this disclosure may receive instructions and data from a read-only memory or a random-access memory or both. Elements of a computer may include one or more central processing units for performing or executing instructions and one or more memory devices for storing instructions and data. A computer may also include, or be operatively coupled to receive, data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a laptop computer, a desktop computer, a television, a mobile audio or video player, a game console, a Global Positioning System (GPS), an assisted Global Positioning System (AGPS) receiver, a portable storage device, such as a universal serial bus (USB) flash drive, to name just a few.

Computer-readable media suitable for storing computer program instructions and data may include all forms of non-volatile memory, media and memory devices, including by way of example, semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this disclosure can be implemented on a computer having a display device, such as a CRT (cathode ray tube), LCD (liquid crystal display) monitor or other suitable display device for displaying information to the user and one or more input devices (e.g., a keyboard and a pointing device, such as a mouse or a trackball) by which the user can provide input to the computer. Other kinds of devices can be used to provide for interaction with a user as well such as, for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described herein can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server may be co-located and/or remote from each other, and they may interact through one or more of a wired and wireless communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this disclosure includes many specifics, these should not be construed as limitations on the scope of the disclosure or of what may be claimed, but rather as descriptions of features specific to particular embodiments of the disclosure. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations depicted and/or described with reference to the drawings may include a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments may have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the disclosure as well as meanings understood by those skilled in the art and/or as defined in dictionaries, treatises, etc. It is also noted that, as used in the disclosure and the appended claims, the singular forms "a," "an," and "the" include plural referents unless otherwise specified, and that the terms "comprises" and/or "comprising," when used in this disclosure, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A system comprising:
a platform comprising one or more servers, the one or more servers comprising one or more processors, a memory and computer-readable instructions that, when executed by the one or more processors, cause the platform to:
generate an interactive graphical user interface (GUI) for display on a user device;
receive, via the interactive GUI, one or more cadence parameters and input defining a mode of play selection;
automatically initiate an object detection sequence based on the one or more cadence parameters;
automatically initiate a video recording of an object for a predetermined period of time that commences when the object detection sequence detects the object;
receive, from the user device, the video recording of the object; and
initiate back-end processing of the video recording of the object, said back-end processing comprising editing the video recording of the object to create a video clip, said editing comprising:
identifying and grouping together video frames among the video recording that capture a flight path of the object with video frames beginning a predetermined amount of time prior to commencement of the flight path of the object, and
deleting all other video frames included in the video recording.

2. The system of claim 1, wherein the one or more cadence parameters comprise a shot clock parameter, a next shot delay parameter, or a combination of both,
the shot clock parameter defining an amount of time a user is given, by the platform, to send the object into motion, the next shot delay parameter defining an amount of time that commences upon conclusion of the shot clock parameter and continues until a subsequent shot clock parameter commences.

3. The system of claim 1, wherein the mode of play selection comprises at least one from the group consisting of a swing away mode, a club training mode, a target practice mode, a putting mode, a play a course mode, a simulation mode, and a general training mode.

4. The system of claim 1, wherein the back-end processing includes deriving metrics relating to the flight path of the object and creating a trace line of the flight path by synthesizing video frames from among the video recording that include said flight path.

5. The system of claim 4, wherein deriving metrics relating to the flight path of the object comprises:
analyzing each video frame in the video clip to determine location data, dimensions data, and point-in-time data relating to the object captured each said video frame in the video clip;
writing the location data, dimensions data, and point-in-time data to a table;
normalizing the location data, dimensions data, and point-in-time data to create normalized data; and
applying mathematical techniques to the normalized data to derive one or more metrics relating to the flight path of the object.

6. The system of claim 5, wherein normalizing the location data, dimensions data and point-in-time data comprises identifying outliers, corrupted data and missing data, and removing the outlier data, resolving the corrupted data and replacing the missing data.

7. The system of claim 6, wherein the computer-readable instructions, when executed by the one or more processors, further cause the platform to execute one or more artificial intelligence (AI) models to perform the normalizing operations.

8. The system of claim 7, wherein creating a trace line of the flight path further comprises plotting the normalized data onto video frames of the video clip.

9. The system of claim 8, wherein the computer-readable instructions, when executed by the one or more processors, further cause the platform to:
store the one or more metrics relating to the flight path of the object;
add the trace line to the video clip to create an enhanced video clip;
transmit the enhanced video clip and the one or more metrics relating to the flight path to the user device; and
store the enhanced video clip and the one or more metrics relating to the flight path in back-end storage.

10. The system of claim 9, wherein the object is a golf ball and wherein the enhanced video clip comprises an image of the user's golf swing, the trace line of the flight path of the golf ball, and the one or more metrics relating to the flight path of the golf ball.

* * * * *